United States Patent
Gouji

(10) Patent No.: US 11,843,857 B2
(45) Date of Patent: Dec. 12, 2023

(54) ACCESSORY THAT IS DETACHABLY CONNECTED TO ELECTRONIC APPARATUS, ELECTRONIC APPARATUS, AND IMAGE PICKUP SYSTEM

(71) Applicant: CANON KABUSHIKI KAISHA, Tokyo (JP)

(72) Inventor: Kazunori Gouji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 17/728,849

(22) Filed: Apr. 25, 2022

(65) Prior Publication Data
US 2022/0353408 A1    Nov. 3, 2022

(30) Foreign Application Priority Data
Apr. 30, 2021  (JP) ................................ 2021-077483

(51) Int. Cl.
*H04N 23/663* (2023.01)
*H04N 23/65* (2023.01)
*H04N 23/63* (2023.01)

(52) U.S. Cl.
CPC ......... *H04N 23/663* (2023.01); *H04N 23/633* (2023.01); *H04N 23/651* (2023.01)

(58) Field of Classification Search
None
See application file for complete search history.

(56) References Cited

U.S. PATENT DOCUMENTS

| | | | |
|---|---|---|---|
| 9,438,780 B2 | 9/2016 | Fujihashi et al. | |
| 10,992,846 B2* | 4/2021 | Mizuochi | B41K 3/32 |
| 11,064,105 B2* | 7/2021 | Saito | G03B 17/565 |
| 11,089,199 B2* | 8/2021 | Takanashi | H04N 23/667 |
| 11,558,541 B2* | 1/2023 | Kobayashi | G03B 17/14 |
| 2012/0114331 A1* | 5/2012 | Kamijo | H04L 12/2885 398/35 |
| 2017/0064635 A1* | 3/2017 | Tanabe | H02J 7/0049 |
| 2021/0181604 A1* | 6/2021 | Kamiya | G03B 17/565 |

FOREIGN PATENT DOCUMENTS

JP    5894397 B2    3/2016

* cited by examiner

*Primary Examiner* — Cynthia Segura
(74) *Attorney, Agent, or Firm* — Canon U.S.A., Inc. IP Division

(57) ABSTRACT

An accessory capable of promptly notifying an electronic apparatus of its state change. The accessory is detachably connected to an electronic apparatus. A first transmission unit transmits first information among information stored in the accessory to the electronic apparatus in response to periodic first communication from a first communication unit of the electronic apparatus. A second transmission unit responds to inquiry by second communication from a second communication unit of the electronic apparatus. A notification unit notifies the electronic apparatus of state change of the accessory when the electronic apparatus is in a first state or a second state and the state of the accessory is changed. In the first state, the first communication is stopped and the second communication unit is in a standby mode. In the second state, power supply to the first communication unit is stopped and the second communication unit is in the standby mode.

17 Claims, 23 Drawing Sheets

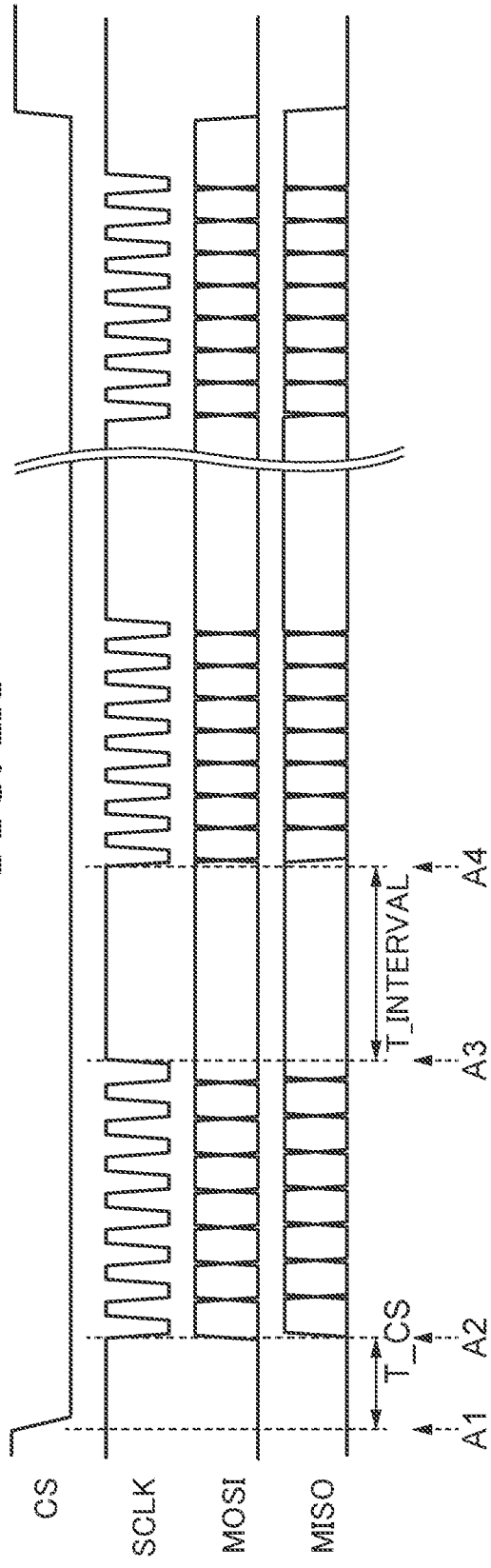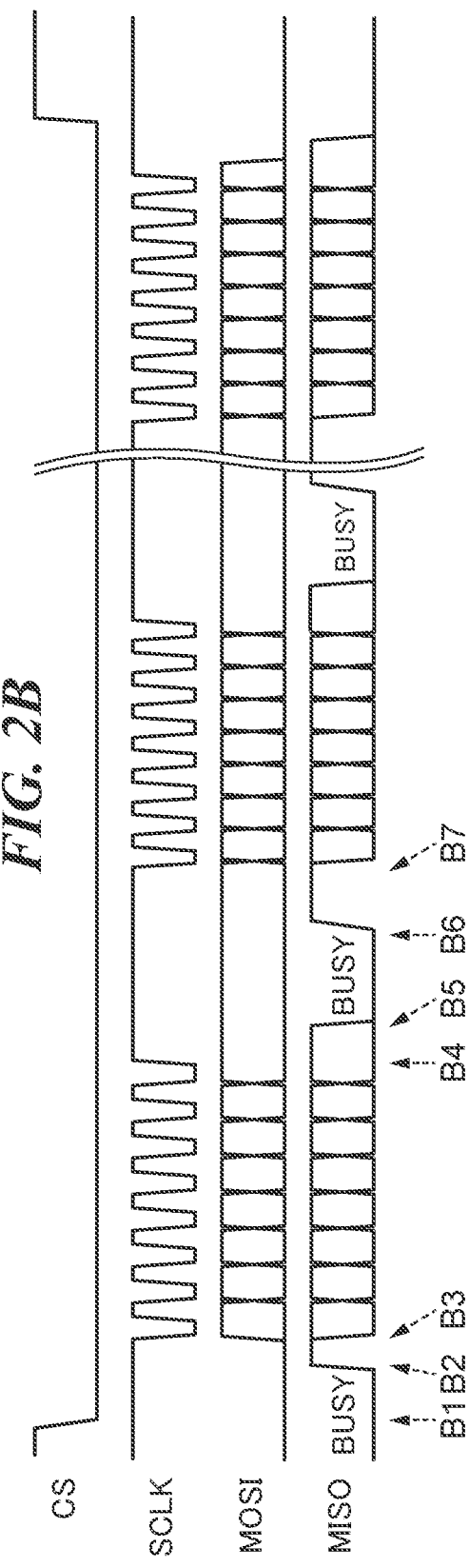

FIG. 5

| | FIRST BYTE | SECOND BYTE | THIRD BYTE | ... | (N-2)th BYTE | (N-1)th BYTE | N-th BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 6

| Address | D7 | D6 | D5 | D4 | D3 | D2 | D1 | D0 |
|---|---|---|---|---|---|---|---|---|
| 0x00 | ACC TYPE | | | | | | | |
| 0x01 | ACC ID NUMBER | | | | | | | |
| 0x02 | FIRMWARE Ver. | | | | | | | |
| 0x03 | POWER SUPPLY WHEN POWER IS OFF | POWER SUPPLY IN POWER SAVE MODE | | POWER SUPPLY SPECIFICATION | | CHARGE SUPPORT | | |
| 0x04 | REQUIRED POWER | | | | | | | |
| 0x05 | FIRMWARE UPDATE MODE | FIRMWARE UPDATE FUNCTION | OPERATION PERMISSION OF INTERMEDIATE CONNECTION ACCESSORY | | CONFIRMATION OF INTERMEDIATE CONNECTION ACCESSORY ON STARTUP OF CAMERA | | PROBABILITY OF I2C COMMAND COMMUNICATION | |
| 0x06 | RESERVED | | METHOD FOR OBTAINING COMMUNICATION REQUEST FACTOR | | FOURTH FUNCTION SIGNAL | THIRD FUNCTION SIGNAL | SECOND FUNCTION SIGNAL | FIRST FUNCTION SIGNAL |
| 0x07 | RESERVED | | | | | | | |
| 0x08 | RESERVED | | | | | | | |
| 0x09 | RESERVED | | | | | | | |
| 0x0A | SILENT STARTUP | RESERVED | | | | | | |
| 0x0B | RESERVE | | | | | | | |
| 0x0C | COMMUNICATION REQUEST FACTOR | | | | | | | |
| 0x0D | | | | | | | SPI PROTOCOL | CS LOGIC |
| 0x0E | COMMUNICATION INTERVAL BETWEEN SPI BYTES | | | | | | | |
| 0x0F | COMMUNICATION INTERVAL BETWEEN SPI BYTES (IN FIRMWARE UPDATE MODE) | | | | | | | |
| | CHECKSUM | | | | | | | |

FIG. 8

| NUMBER | TYPE |
|---|---|
| 0x00 | RESERVED |
| 0x01 | RESERVED |
| : | : |
| 0x80 | RESERVED |
| 0x81 | FLASH |
| 0x82 | INTERFACE CONVERSION ADAPTER |
| 0x83 | MICROPHONE |
| 0x84 | MULTIPLE ACCESSORY CONNECTION ADAPTER |
| 0x85 | RESERVED |
| 0x86 | RESERVED |
| 0x87 | RESERVED |
| 0x88 | RESERVED |
| 0x89 | RESERVED |
| 0x90 | RESERVED |
| : | : |
| 0xFF | RESERVED |

FIG. 9

| FACTOR NUMBER | CONTENT OF FACTOR |
|---|---|
| 0x00 | PRESS OF MENU CALL SWITCH |
| 0x01 | COMPLETION OF AUDIO STABILIZATION |
| 0x02 | RELEASE AUDIO MUTE STATE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 10A

| | COMMUNICATION INTERVAL |
|---|---|
| 0 | 1μs |
| 1 | 2μs |
| 2 | 5μs |
| 3 | 10μs |
| 4 | 15μs |
| 5 | 25μs |
| 6 | 50μs |
| 7 | 100μs |

FIG. 10B

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

ACCESSORY THAT IS DETACHABLY CONNECTED TO ELECTRONIC APPARATUS, ELECTRONIC APPARATUS, AND IMAGE PICKUP SYSTEM

BACKGROUND

Field of the Disclosure

The present disclosure relates to an accessory that is detachably connected to an electronic apparatus, the electronic apparatus, and an image pickup system configured by connecting the accessory to an image pickup apparatus.

Description of the Related Art

Generally, an image pickup apparatus like a digital camera is configured so that an accessory like a flash device can be connected. Moreover, the image pickup apparatus has a controller that controls communications with the connected flash device through an interface. For example, the controller transmits a signal instructing light emission to the flash device. However, when the image pickup apparatus is in a power saving mode and the controller is not operating, data cannot be exchanged between the image pickup apparatus and the flash device. Accordingly, even if a state of the flash device varies in such a case, the flash device cannot notify the image pickup apparatus that the state of the flash device varies.

Japanese Patent Publication No. 5894397 (the counterpart of U.S. Pat. No. 9,438,780) suggests a configuration in which a flash device can start an image pickup apparatus in a power saving mode.

However, since the technique disclosed in the above-mentioned publication determines the state of the image pickup apparatus after the state of the flash device varies, a period from the state change of the flash device to the startup of the image pickup apparatus becomes long.

Moreover, when a flash device is detached from the image pickup apparatus in the power saving mode and the image pickup apparatus will be in an initial state where the image pickup apparatus is not connected with an accessory, a conventional flash device cannot detect such a state.

SUMMARY

Embodiments of the present disclosure provide an accessory, an electronic apparatus, and an image pickup system, which are capable of promptly notifying the electronic apparatus of state change of the accessory based on a state of the electronic apparatus equipped with the accessory when the state of the accessory varies.

According to embodiments of the present disclosure, an accessory is detachably connected to an electronic apparatus, the accessory including a memory device that stores a set of instructions, and at least one processor that executes the set of instructions to transmit first information among information stored in the accessory to the electronic apparatus in response to periodic first communication from a first communication unit of the electronic apparatus, respond to inquiry by second communication from a second communication unit of the electronic apparatus, and notify the electronic apparatus of change of the information stored in the accessory, in a case where the electronic apparatus is in one of a first state and a second state and the information stored in the accessory is changed, wherein the first communication is stopped and the second communication unit is in a standby mode in the first state, and wherein power supply to the first communication unit is stopped and the second communication unit is in the standby mode in the second state.

According to embodiments of the present disclosure, when the state of the accessory varies, the electronic apparatus is promptly notified of the state change of the accessory based on the state of the electronic apparatus equipped with the accessory.

Further features of the present disclosure will become apparent from the following description of exemplary embodiments with reference to the attached drawings.

BRIEF DESCRIPTION OF THE DRAWINGS

FIG. 2A and FIG. 2B are charts schematically showing communication waveforms of first and second SPI protocols, respectively.

FIG. 5 is a view showing communication contents of an operation execution instruction (command) transmitted from the camera to the accessory by the SPI communication.

FIG. 6 is a view showing an example of accessory information.

FIG. 8 is a view showing an example of accessory type information.

FIG. 9 is a view showing examples of factors of a communication request signal/WAKE.

FIG. 10A is a view showing examples of communication intervals between communication bytes that are set in the address "0x0D" in FIG. 6. FIG. 10B is a view showing examples of communication intervals between communication bytes that are set in the address "0x0E" in FIG. 6.

DESCRIPTION OF THE EMBODIMENTS

Figure 1:
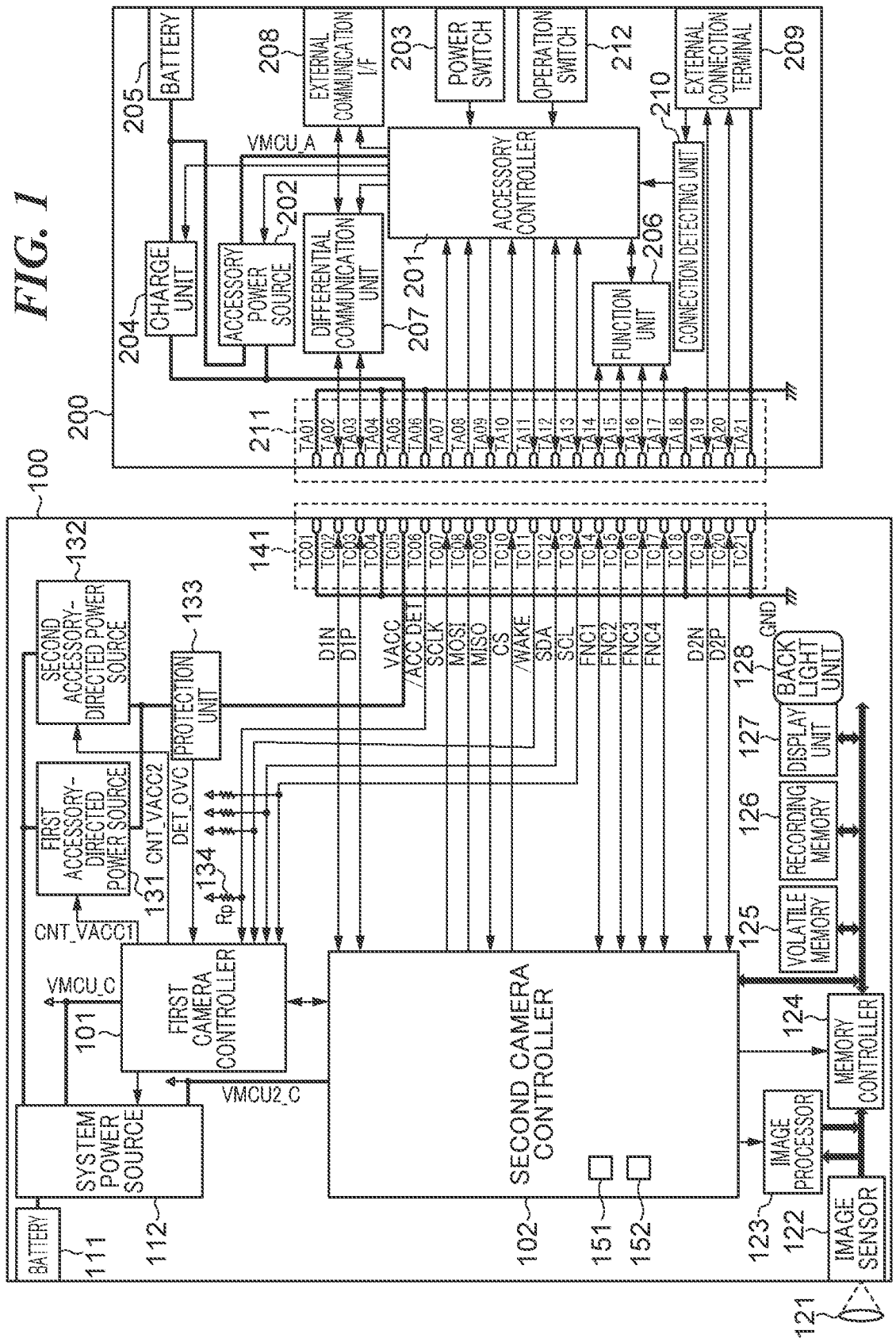
FIG. 1 is a block diagram schematically showing an image pickup system including an image pickup apparatus (a camera) as an electronic apparatus and an accessory according to an embodiment of the present disclosure.

Hereafter, some exemplary embodiments according to the present disclosure will be described in detail by referring to the drawings.

FIG. 1 is a block diagram schematically showing an image pickup system including an image pickup apparatus as an electronic apparatus and an accessory according to an embodiment of the present disclosure. This image pickup system includes a camera 100 as the image pickup apparatus and an accessory 200. The accessory 200 is detachable from the camera 100. FIG. 1 shows electric configurations of the camera 100 and the accessory 200.

The camera 100 is provided with a camera-side connector 141 as an attachment part to which the accessory 200 is attachable. The camera-side connector 141 has contacts TC01 through TC21 that are a plurality of terminals. The accessory 200 is provided with an accessory-side connector 211. The accessory-side connector 211 has contacts TA01 through TA21 that are a plurality of terminals. The camera 100 and the accessory 200 are electrically connected by contacting the contacts TC01 through TC21 with the contacts TA01 through TA21, respectively. It should be noted that the accessory 200 may have a part of the contacts TA01 through TA21.

Electric power is supplied to the camera 100 from a battery 111. The battery 111 is detachable from the camera 100. Each of a first camera controller 101 and a second camera controller 102 is constituted by a microcomputer that contains a CPU etc. and controls the whole of the camera 100. The first camera controller 101 is monitoring operations of switches (not shown) that control the camera. The first camera controller 101 operates even when the camera 100 is in a suspended state (a power saving mode), and controls a system power source 112 etc. according to a user's operation. The second camera controller 102 controls an image sensor 122, a display unit 127, etc., and stops an operation in the suspended state. Although this embodiment describes the case where the first camera controller 101 and the second camera controller 102 are constituted by separate processors, these controllers may be constituted in a single processor.

The system power source 112 is constituted by a DCDC converter, an LDO (Low Drop Out), a charge pumping circuit, etc., and generates electric power supplied to sections of the camera 100. The battery 111 usually supplies a voltage of 1.8V generated by the system power source 112 as a camera-microcomputer power VMCU_C to the first camera controller 101. Moreover, several kinds of voltages generated by the system power source 112 as a camera-microcomputer power VMCU2_C are supplied to the second camera controller 102 at arbitrary timings. The first camera controller 101 controls ON/OFF of the power supply to the sections of the camera 100 by controlling the system power source 112.

The image sensor 122 consists of a CMOS sensor, a CCD sensor, or the like. An optical lens 121 is detachably attached to the camera 100. Light from an object entered through the optical lens 121 forms an image on the image sensor 122. It should be noted that the optical lens 121 may be united with the camera 100. The object image formed on the image sensor 122 is coded into a digital image pickup signal. The image processing unit 123 generates image data by applying image processes, such as a noise reduction process and a white balance process, to the digital image pickup signal. Moreover, the image processing unit 123 converts the generated image data into an image file of a JPEG format in order to record the image data in the recording memory 126. Moreover, the image processing unit 123 generates VRAM image data, which is displayed on the display unit 127, from the generated image data.

The memory controller 124 controls transmission and reception of the image data and other data that are generated by the image processing unit 123 etc. A volatile memory 125 is a memory like a DDR3 SDRAM that enables high-speed reading and writing, and is used as a work space of the image processes performed by the image processing unit 123. The recording memory 126 is a medium capable of reading and writing, such as an SD card or a CF express card, and is a recording medium that is attachable to the camera 100. The display unit 127 includes a display panel, such as an LCD panel or an organic EL display panel, that is arranged on the backface of the camera 100. A back light unit 128 adjusts brightness of the display unit 127 by changing a light amount of a back light of the display unit 127.

A first accessory-directed power source 131 and a second accessory-directed power source 132 generate accessory power VACC of 3.3V that is a voltage convertor that converts the voltage supplied from the system power source 112 into a predetermined voltage. It should be noted that the first accessory-directed power source 131 and the second accessory-directed power source 132 may convert the supplied voltage into a voltage other than 3.3V.

The first accessory-directed power source 131 is a power supply circuit consisting of an LDO of which self-power consumption is small. The second accessory-directed power source 132 consists of a DC/DC convertor and can supply an electric current that is larger than an electric current that is supplied by the first accessory-directed power source 131. The self-power consumption of the second accessory-directed power source 132 is larger than the self-power consumption of the first accessory-directed power source 131. Accordingly, when a load current is small, the first accessory-directed power source 131 is more efficient than the second accessory-directed power source 132. When the load current is large, the second accessory-directed power source 132 is more efficient than the first accessory-directed power source 131. The first camera controller 101 controls ON/OFF of each of the voltage outputs of the first accessory-directed power source 131 and second accessory-directed power source 132 on the basis of an operating state of the accessory 200.

A protection unit 133 is constituted by a current fuse element, a poly-switch element, or an electronic fuse unit that combines a resistance, an amplifier and a switch element. The protection unit 133 outputs an overcurrent detection signal DET_OVC, when the current value of the electric power supplied to the accessory 200 from the first accessory-directed power source 131 or the second accessory-directed power source 132 becomes excessive (abnormal) exceeding a predetermined value. The protection unit 133 is an electronic fuse, for example, and notifies the first camera controller 101 of the overcurrent detection signal DET_OVC when the electric current more than 1A flows. A High level of the overcurrent detection signal DET_OVC shows overcurrent. It should be noted that the predetermined value may be different from 1A.

The camera-side connector 141 electrically connects with the accessory 200 through twenty-one contacts TC01 through TC21 arranged on a line. The contacts TC01 through TC21 are arranged in this order from one end to the other end in the arrangement direction. The contact TC01 is connected to the ground (GND). The contact TC01 functions as a contact of a reference potential and as a contact that controls wiring impedances of a differential signal D1N and differential signal D1P. The contact TC01 is equivalent to a third grand contact.

A signal line of the differential signal MN connected to the contact TC02 and a signal line of the differential signal D1P connected to the contact TC03 are connected to the second camera controller 102. These differential signals D1N and D1P are differential data communication signals that perform data communication as a mutual pair. The contacts TC02 and TC03, the contacts TC07 through TC17, TC19, and TC20 mentioned later are communication contacts.

The contact TC04 as a first grand contact is connected to the GND and functions as a contact of the reference potential of the camera 100 and accessory 200. The contact TC04 is arranged at an outer side than the contact TC05 in the contact arrangement direction. The accessory power VACC generated by the first and second accessory-directed power sources 131 and 132 are connected to the contact TC05 as a power-source contact through the protection unit 133.

A signal line of an accessory attachment detection signal/ACC_DET is connected to the contact TC06 as an attachment detection contact. The accessory attachment detection signal/ACC_DET is pulled up to the camera-microcomputer power VMCU_C through a resistance element Rp134 (for example, 10 kΩ). The first camera controller 101 can detect the attachment of the accessory 200 by reading the signal level of the accessory attachment detection signal/ACC_DET. When the signal level (electric potential) of the accessory attachment detection signal/ACC_DET is a High level (predetermined potential), it is detected that the accessory 200 is not attached. When it is a Low level (GND potential mentioned later), it is detected that the accessory 200 is in an attached state.

Change of the signal level (electric potential) of the accessory attachment detection signal/ACC_DET to the Low level from the High level at the time of the power ON of the camera 100 becomes a trigger that causes transmission of various signals between the camera 100 and accessory 200 through the contacts.

When detecting that the accessory 200 comes into the attached state, the first camera controller 101 supplies the electric power to the accessory 200 through the contact TC05 as the power-source contact.

A signal line of SCLK (Serial Clock) is connected to the contact TC07. A signal line of MOSI (Main Out Secondary In) is connected to the contact TC08. A signal line of MISO (Main In Secondary Out) is connected to the contact TC09. A signal line of CS (Communication Secondary) is connected to the contact TC10. The SCLK, MOSI, MISO, and CS are signals to perform SPI (Serial Peripheral Interface (registered trademark)) communication by the second camera controller 102 that becomes a communication main. In the embodiment, the communication clock frequency of the SPI communication shall be 1 MHz, its data length shall be 8 bits (1 byte), and its bit order shall be the MSB first, and its communication system shall be full duplex.

A signal line of a communication request signal/WAKE used when the accessory 200 requests communication from the first camera controller 101 is connected to the contact TC11. The communication request signal/WAKE is pulled up to the camera-microcomputer power VMCU_C through a resistance. The first camera controller 101 can receive the communication request from the accessory 200 by detecting a falling edge of the communication request signal/WAKE.

A signal SDA communicated through the contact TC12 and a signal SCL communicated through the contact TC13 are signals to perform I2C (Inter-Integrated Circuit (registered trademark)) by the first camera controller 101 that becomes the communication main. The signals SDA and SCL are pulled up to the camera-microcomputer power VMCU_C and achieve an open-drain output specification. The communication frequency of this communication shall be 100 kbps. In the I2C communication, both data transmission from the camera 100 and data transmission from the accessory 200 are performed via the SDA. The communication speed of the I2C communication is lower than that of the SPI communication. Accordingly, the SPI communication is more suitable for communication of information having large data amount than the I2C communication. Accordingly, the camera 100 and accessory 200 of this embodiment use the SPI communication for communication of information having large data amount and use the I2C communication for communication of information having small data amount. For example, the communication can be controlled so that data will be first transferred using the I2C communication and will perform the SPI communication next in a case where the SPI communication can be performed on the basis of the data or the SPI communication is needed to perform.

Figure 17A:
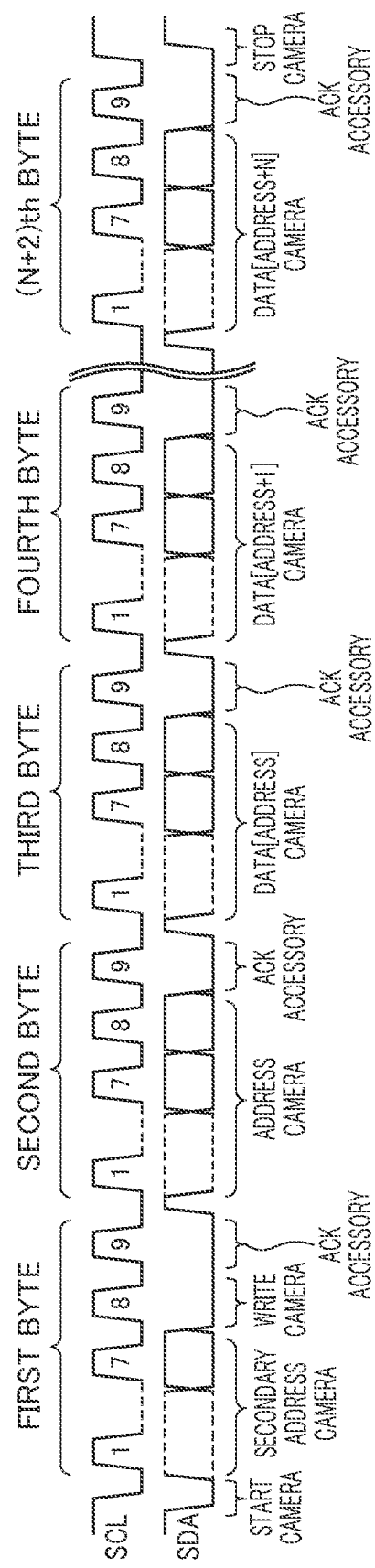
FIG. 17A and FIG. 17B are charts showing examples of I2C communication waveforms.
Figure 17B:
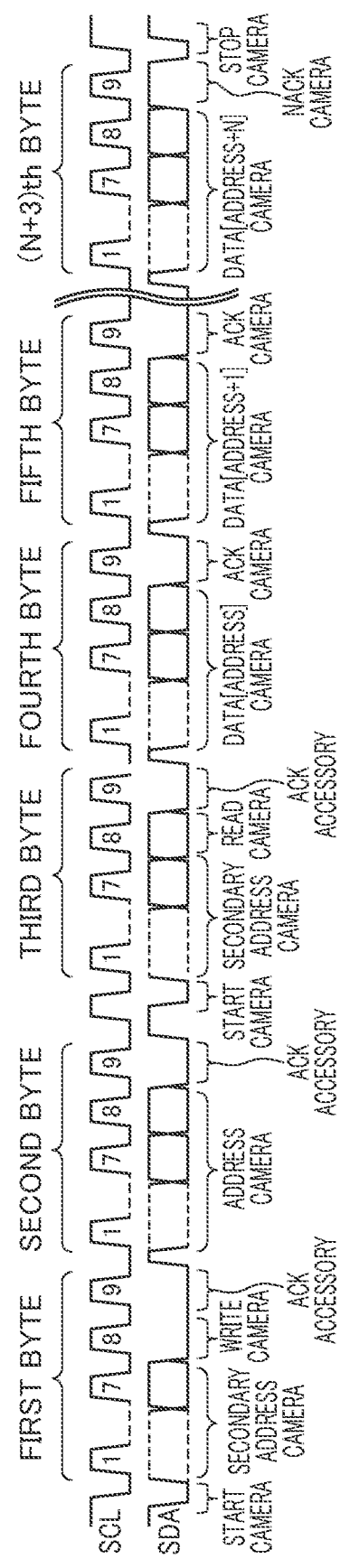

FIG. 17A and FIG. 17B are charts showing examples of I2C communication waveforms. FIG. 17A shows the waveform example in a case where the camera transmits actual data of N bytes (DATA[ADDRESS] through DATA [ADDRESS+N]) to the accessory. FIG. 17B shows the waveform example in a case where the camera receives actual data of N bytes (DATA [ADDRESS] through DATA [ADDRESS+N]) from the accessory.

In each of FIG. 17A and FIG. 17B, the upper waveform shows the signal SCL and the lower waveform shows the signal SDA.

Under the waveform of the signal SDA, a meaning shown by the signal SDA at each timing is shown. Moreover, which of the first camera controller 101 (camera) and the accessory controller 201 (accessory) is controlling the output level of the signal SDA is shown.

Moreover, since communication data consists of data of one-byte unit and one-bit information showing an acknowledgement (ACK), the order of byte of data from the start of the communication is shown above each communication data of the waveforms in each of FIG. 17A and FIG. 17B in order to make the description easier to understand.

Since details of the communication contents will be described with flowcharts in FIG. 18 through FIG. 20, an outline will be described by referring to FIG. 17A and FIG. 17B.

In the communication of the first and second bytes in FIG. 17A, the first camera controller 101 transmits address data showing a storage address of the accessory side to which the transmitted data will be stored to the accessory controller 201. In the communication from the third byte to the (N+2)th byte, the first camera controller 101 transmits actual data of N bytes (DATA[ADDRESS] through DATA[ADDRESS+N]) to the accessory controller 201.

In the communication of the first and second bytes in FIG. 17B, the first camera controller 101 transmits address data showing a stored address of the data that will be received to the accessory controller 201. In the communication from the third byte to the (N+3)th byte, the first camera controller 101 receives actual data of N bytes (DATA[ADDRESS] through DATA[ADDRESS+N]) from the accessory controller 201.

Next, the flowcharts in FIG. 18 through in FIG. 20 will be described.

Figure 18:
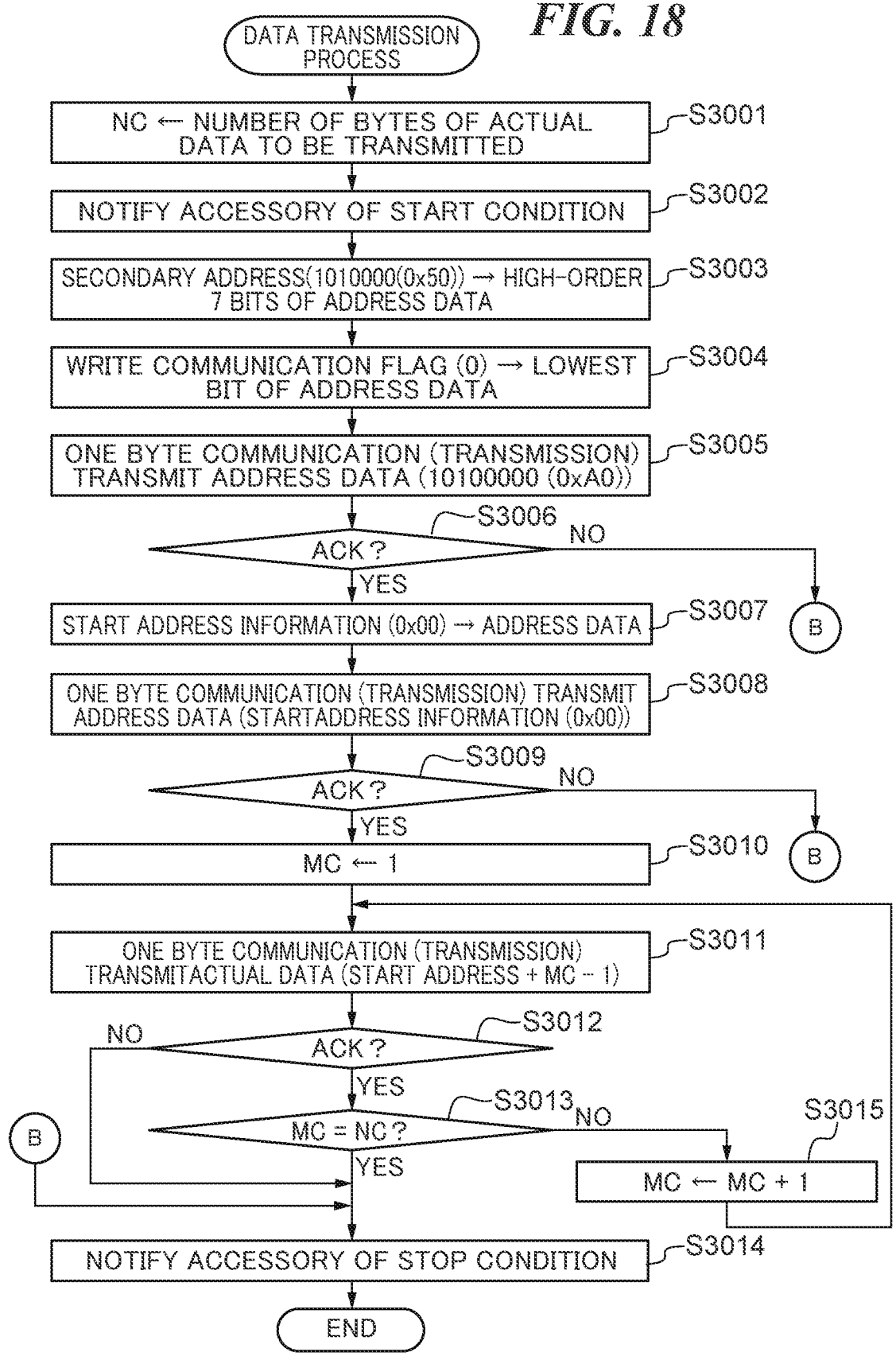
FIG. 18 is a flowchart showing a data transmission process executed when a first camera controller transmits N bytes of data to the accessory controller.

FIG. 18 is a flowchart showing a data transmission process executed by the first camera controller 101 when the first camera controller 101 transmits N bytes of actual data to the accessory controller 201. This process is achieved when the CPU in the first camera controller 101 develops and runs a program stored in a ROM (not shown) in the first camera controller 101 to a RAM (not shown) in the first camera controller 101.

In a step S3001, the first camera controller 101 stores the number of bytes of the actual data to transmit into a variable NC. For example, when three bytes of the actual data will be transmitted, the number "3" is stored into the variable NC. The number "3" shall be stored into the variable NC in the embodiment.

In a step S3002, the first camera controller 101 notifies the accessory controller 201 of a START condition by changing the SDA to the Low level while the SCL is the High level. Thereby, the accessory controller 201 is notified of start of communication.

In a step S3003, the first camera controller 101 sets high-order 7 bits of address data to secondary address information that shows a secondary address of the accessory controller 201. In the embodiment, the secondary address of the accessory controller 201 shall be "1010000" in binary ("0x50" in hexadecimal).

In a step S3004, the first camera controller 101 sets the low-order one bit of the address data to a flag "0" showing a WRITE communication. Setting of "0" to this bit means the WRITE communication.

In a step S3005, the first camera controller 101 transmits the address data ("10100000" in binary, "0xA0" in hexadecimal), which is set in the step S3003 and step S3004, to the accessory controller 201.

In a step S3006, the first camera controller 101 outputs one clock of the SCL after transmitting the one-byte data and checks the signal level of the SDA. When the signal level of the SDA is Low, the first camera controller 101 determines as data acknowledgement (ACK) from the accessory controller 201 and proceeds with the process to a step S3007. In the meantime, when the signal level of the SDA is High, the first camera controller 101 determines that the accessory controller 201 cannot receive the data normally and proceeds with the process to a step S3014.

In the step S3007, the first camera controller 101 sets start address information about a storage address of actual data transmitted to the accessory controller 201 as address data. In the embodiment, the size of the start address information is one byte and the value shall be "0x00".

In a step S3008, the first camera controller 101 transmits the address data, to which one byte of the start address information (value "0x00") is set, to the accessory controller 201. In a step S3009, the first camera controller 101 outputs one clock of the SCL after transmitting the address data and checks the signal level of the SDA. When the signal level of the SDA is Low, the first camera controller 101 determines as data acknowledgement (ACK) from the accessory controller 201 and proceeds with the process to a step S3010. In the meantime, when the signal level of the SDA is High, the first camera controller 101 determines that the accessory controller 201 cannot receive the data normally and proceeds with the process to the step S3014.

In the step S3010, the first camera controller 101 stores "1" into a variable MC. The variable MC is used to count the number of bytes of the transmitted actual data. In a step S3011, the first camera controller 101 outputs one byte of the SCL and transmits one byte of actual data corresponding to a predetermined address (start address+MC−1) to the accessory controller 201 by changing the SDA to a predetermined signal level while the SCL is the Low level. In the description, since the start address information is "0x00" and the variable MC is "1", the first camera controller 101 transmits one byte of actual data corresponding to the address "0x00".

In a step S3012, the first camera controller 101 outputs one clock of the SCL after transmitting the one-byte data and checks the signal level of the SDA. When the signal level of the SDA is Low, the first camera controller 101 determines as data acknowledgement (ACK) from the accessory controller 201 and proceeds with the process to a step S3013. In the meantime, when the signal level of the SDA is High, the first camera controller 101 determines that the accessory controller 201 cannot receive the data normally and proceeds with the process to the step S3014.

In the step S3013, the first camera controller 101 determines whether the variable MC is equal to the variable NC. When the variable MC is equal to the variable NC, the first camera controller 101 determines that the transmission of all the actual data is completed and proceeds with the process to the step S3014. When the variable MC is not equal to the variable NC, the first camera controller 101 determines that untransmitted actual data still remains and proceeds with the process to a step S3015.

In the step S3015, the first camera controller 101 adds "1" to the variable MC and returns the process to the step S3011. After the process returns to the step S3011, the first camera controller 101 sequentially increments the address of the actual data to be transmitted and transmits one byte of the actual data corresponding to each address.

In this way, the first camera controller 101 transmits the N bytes of actual data by repeatedly transmitting one byte of actual data until it is determined that the variable MC is equal to the variable NC in the process of the step S3013. When the variable NC is set to "3" like the embodiment, three bytes of actual data can be transmitted.

In the step S3014, the first camera controller 101 notifies the accessory controller 201 of a STOP condition by changing the SDA to the High level while the SCL is the High level. Thereby, the accessory controller 201 is notified of finish of the communication.

Figure 19:
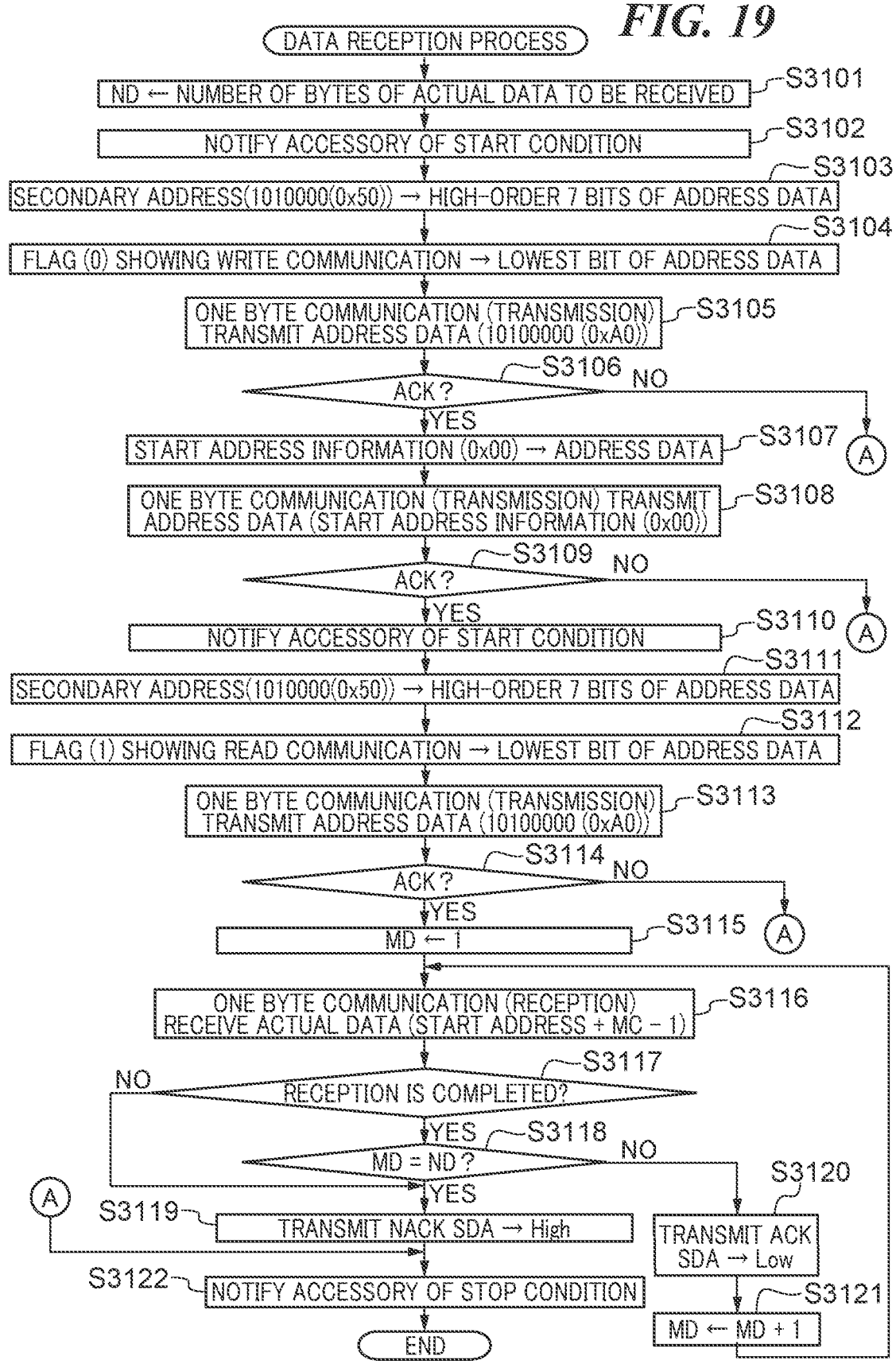
FIG. 19 is a flowchart showing a data reception process executed when the first camera controller receives N bytes of data from the accessory controller.

FIG. 19 is a flowchart showing a data receiving process executed by the first camera controller 101 when the first camera controller 101 receives N bytes of actual data from the accessory controller 201. This process is achieved when the CPU in the first camera controller 101 develops and runs a program stored in a ROM (not shown) in the first camera controller 101 to a RAM (not shown) in the first camera controller 101.

In a step S3001, the first camera controller 101 stores the number of bytes of the actual data to receive into a variable ND. For example, when three bytes of the actual data will be received, the number "3" is stored into the variable ND. The number "3" shall be stored into the variable ND in the embodiment. In steps S3102 through S3106, the first camera controller 101 executes the processes similar to the steps S3002 through S3006, respectively.

In the step S3107, the first camera controller 101 sets start address information about a storage address of actual data received from the accessory controller 201 as address data. In the embodiment, the size of the start address information is one byte and the value shall be "0x00". In a step S3108, the first camera controller 101 transmits the address data, to which one byte of the start address information (value "0x00") is set, to the accessory controller 201.

In a step S3109, the first camera controller 101 outputs one clock of the SCL after transmitting the address data and checks the signal level of the SDA. When the signal level of the SDA is Low, the first camera controller 101 determines as data acknowledgement (ACK) from the accessory controller 201 and proceeds with the process to a step S3110. In the meantime, when the signal level of the SDA is High, the first camera controller 101 determines that the accessory controller 201 cannot receive the data normally and proceeds with the process to a step S3122.

In the step S3110, the first camera controller 101 notifies the accessory controller 201 of the START condition by changing the SDA to the Low level while the SCL is the High level as with the step S3102. In a step S3111, the first camera controller 101 sets high-order 7 bits of address data to secondary address information that shows a secondary address of the accessory controller 201. In the embodiment, the secondary address of the accessory controller 201 shall be "1010000" in binary.

In a step S3112, the first camera controller 101 sets the low-order one bit of the address data to a flag "1" showing a READ communication. Setting of "1" to this bit means the READ communication.

In a step S3113, the first camera controller 101 transmits the address data ("10100001" in binary, "0xA1" in hexadecimal), which is set in the step S3111 and step S3112, to the accessory controller 201.

In a step S3114, the first camera controller 101 outputs one clock of the SCL after transmitting the one-byte data and checks the signal level of the SDA. When the signal level of the SDA is Low, the first camera controller 101 determines as data acknowledgement (ACK) from the accessory controller 201 and proceeds with the process to a step S3115. In the meantime, when the signal level of the SDA is High, the first camera controller 101 determines that the accessory controller 201 cannot receive the data normally and proceeds with the process to the step S3014.

In the step S3115, the first camera controller 101 stores "1" into a variable MD. The variable MD is used to count the number of bytes of the received actual data. In step a S3116, the first camera controller 101 outputs one byte of the SCL and reads the signal level of the SDA of a timing of variation of the SCL from Low to High. Thereby, one byte of the actual data can be received from the accessory controller 201. The one byte of the received actual data can be stored into the volatile memory 125 or can be used for a predetermined process as the data corresponding to the address "0x00".

In a step S3117, the first camera controller 101 determines whether one byte of the actual data has been normally received. When the data has been normally received, the first camera controller 101 proceeds with the process to a step S3118. When the data has not been normally received, the first camera controller 101 proceeds with the process to a step S3119.

In the step S3118, the first camera controller 101 determines whether the variable MD is equal to the variable ND. When the variable MD is equal to the variable ND, the first camera controller 101 determines that the reception of all the actual data is completed and proceeds with the process to the step S3119. When the variable MD is not equal to the variable ND, the first camera controller 101 determines that untransmitted actual data still remains and proceeds with the process to a step S3120.

In the step S3120, the first camera controller 101 outputs one byte of the SCL and transmits the data acknowledgement (ACK) to notify the accessory controller 201 that the data communication continues by controlling the SDA to the Low level. In a step S3121, the first camera controller 101 adds "1" to the variable MD and returns the process to the step S3116. After the process returns to the step S3116, the first camera controller 101 sequentially increments the address of the actual data to be received and receives one byte of the actual data corresponding to each address.

In this way, the first camera controller 101 receives the N bytes of actual data by repeatedly receiving one byte of actual data until it is determined that the variable MD is equal to the variable ND in the process of the step S3118. When the variable ND is set to "3" like the embodiment, three bytes of actual data can be received.

In the step S3119, the first camera controller 101 outputs one byte of the SCL and notifies the accessory controller 201 that the data communication is completed (NACK) by controlling the SDA to the High level. In the step S3122, the first camera controller 101 notifies the accessory controller 201 of the STOP condition by changing the SDA to the High level while the SCL is the High level. Thereby, the accessory controller 201 is notified of finish of the communication.

Figure 20:
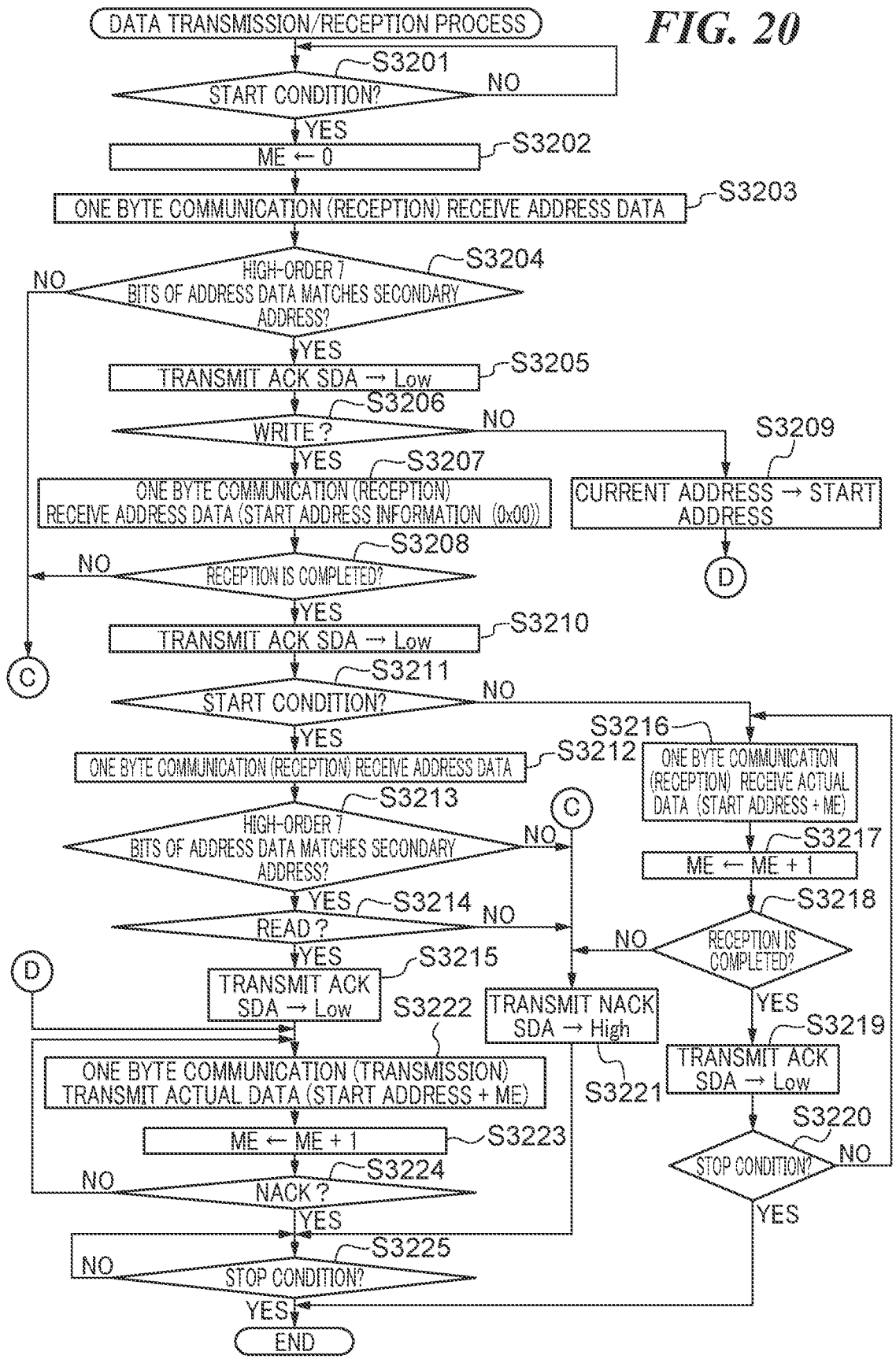
FIG. 20 is a flowchart showing a data transmission/reception process executed when N bytes of data are transmitted and received between the accessory controller and the first camera controller.

FIG. 20 is a flowchart showing a data transmission/reception process executed by the accessory controller 201 when N bytes of data are communicated between the first camera controller 101 and the accessory controller 201. This process includes the process that receives N bytes of actual data from the first camera controller 101 by the accessory controller 201 and the process that transmits N bytes of actual data to the first camera controller 101 by the accessory controller 201.

This process is achieved when a CPU in the accessory controller 201 develops and runs a program stored in a ROM (not shown) in the accessory controller 201 to a RAM (not shown) in the accessory controller 201.

In a step S3201, the accessory controller 201 waits for change of the SDA to the Low level (occurrence of the START condition) while the SCL keeps the High level. When detecting the START condition, the accessory controller 201 proceeds with the process to a step S3202.

In the step S3202, the accessory controller 201 stores "0" into a variable ME. The variable ME is used to count the number of bytes of actual data to be transmitted and received. In a step S3203, the accessory controller 201 receives one byte of the address data transmitted from the first camera controller 101.

In a step S3204, the accessory controller 201 determines whether the data of the high-order 7 bits of the address data received in the step S3203 matches the secondary address ("0x50" in the embodiment) of the accessory controller 201. When the data of the high-order 7 bits matches the secondary address of the accessory controller 201, the accessory controller 201 proceeds with the process to a step S3205. When the data of the high-order 7 bits does not match the secondary address of the accessory controller 201, the accessory controller 201 proceeds with the process to a step S3221.

In the step S3205, the accessory controller 201 transmits the data acknowledgement (ACK) to the first camera controller 101 by controlling the SDA to the Low level in response to the next SCL clock output after receiving the address data. In a step S3206, the accessory controller 201 determines the type of data of the next one-byte communication on the basis of the data of the low-order one bit of the address data received in the step S3203. When the data of the low-order one bit is "0" (WRITE), the accessory controller 201 determines that the data of the next one-byte communication is the start address information to the accessory controller 201 from the first camera controller 101, and then proceeds with the process to a step S3207. When the data of the low-order one bit is "1", the accessory controller 201 determines that the data of the next one-byte communication is the actual data transmitted to the first camera controller 101 from the accessory controller 201, and then proceeds with the process to a step S3209.

In the step S3207, the accessory controller 201 receives one byte of the address data transmitted from the first camera controller 101. The received address data means the start address information that shows the address in which the data transmitted and received by the future communication is stored. In the embodiment, the start address information shall be "0x00" as described by referring to FIG. 18 and FIG. 19.

In the step S3209, the accessory controller 201 sets up the address information that the accessory controller 201 has stored beforehand or the address information beforehand received from the first camera controller 101 as the start address information.

In a step S3208, the accessory controller 201 determines whether one byte of data has been normally received. When it is determined that the data has been normally received, the process proceeds to a step S3210. When it is determined that the data has not been normally received, the process proceeds to the step S3221. In the step S3210, the accessory controller 201 transmits the data acknowledgement (ACK) to the first camera controller 101 by controlling the SDA to the Low level in response to the next SCL clock output data reception after receiving the one byte of data.

In a step S3211, the accessory controller 201 determines whether the SDA is changed to the Low level (whether the START condition is detected) while the SCL keeps the High level. When the START condition is detected, the accessory controller 201 can determine that the one byte of data that is subjected to the next communication is address data that will be received by the accessory controller 201 from the first camera controller 101. Namely, the accessory controller 201 determines that the one byte of data that is subjected to the next communication is the address data that shows the secondary address and the communication type. Then, the process proceeds to a step S3212. When the START condition is not detected, the accessory controller 201 determines that the one byte of data that is subjected to the next communication is actual data that will be received by the accessory controller 201 from the first camera controller 101, and then proceeds with the process to a step S3216.

In the step S3212, the accessory controller 201 receives one byte of the address data transmitted from the first camera controller 101. In a step S3213, the accessory controller 201 determines whether the data of the high-order 7 bits of the address data received in the step S3212 matches the secondary address ("0x50" in the embodiment) of the accessory controller 201. When the data of the high-order 7 bits matches the secondary address of the accessory controller 201, the accessory controller 201 proceeds with the process to a step S3214. When the data of the high-order 7 bits does not match the secondary address of the accessory controller 201, the accessory controller 201 proceeds with the process to the step S3221.

In the step S3214, the accessory controller 201 determines the type of data of the next one-byte communication on the basis of the data of the low-order one bit of the address data received in the step S3203. When the data of the low-order one bit is "0", the accessory controller 201 proceeds with the process to the step S3221. When the data of the low-order one bit is "1" (READ), the accessory controller 201 determines that the data of the next one-byte communication is the actual data transmitted to the first camera controller 101 from the accessory controller 201, and then proceeds with the process to a step S3215.

In the step S3215, the accessory controller 201 transmits the data acknowledgement (ACK) to the first camera controller 101 by controlling the SDA to the Low level in response to the next SCL clock output after receiving the one byte of data. In a step S3222, the accessory controller 201 transmits the start address information received from the first camera controller 101 in the step S3207 to the first camera controller 101 or transmits the one byte of actual data corresponding to the start address information established in the step S3209 to the first camera controller 101.

The accessory controller 201 adds "1" to the variable ME in a step S3223, and the process proceeds to a step S3224. In the step S3224, the accessory controller 201 checks the signal level of the SDA after transmitting the one byte of actual data. When the signal level of the SDA is High, the accessory controller 201 determines to be the notification (NACK) showing that the first camera controller 101 has received all the actual data, and then proceeds with the process to a step S3225. In the meantime, when the signal level of the SDA is Low, the accessory controller 201 determines that the first camera controller 101 still requests the actual data transmission from the accessory controller 201, and then returns the process to the step S3222.

After the process returns to the step S3222 in this way, the accessory controller 201 sequentially increments the address of the actual data to be transmitted and transmits one byte of the actual data corresponding to each address. In this way, the accessory controller 201 transmits the N bytes of the actual data to the first camera controller 101 by repeatedly transmitting one byte of actual data until the NACK is received from the first camera controller 101 by the process in the step S3224.

In the step S3225, the accessory controller 201 waits for change of the SDA to the High level (occurrence of the STOP condition) while the SCL keeps the High level. When the STOP condition is detected, the accessory controller 201 finishes the communication.

In the step S3216, the accessory controller 201 receives one byte of the actual data. The one byte of the actual data may be stored into the nonvolatile memory (not shown) or may be used for a predetermined process as the data corresponding to the start address information received from the first camera controller 101 in the step S3207.

The accessory controller 201 adds "1" to the variable ME in a step S3217 and proceeds with the process to a step S3218. In the step S3218, the accessory controller 201 determines whether one byte of actual data has been normally received. When the accessory controller 201 determines that the one byte of the actual data has been normally received, the process proceeds to a step S3219. When it is determined that the data has not been normally received, the process proceeds to the step S3221.

In the step S3219, the accessory controller 201 transmits the data acknowledgement (ACK) to the first camera controller 101 by controlling the SDA to the Low level in response to the next SCL clock output after receiving the one byte of data.

In a step S3220, the accessory controller 201 determines whether the SDA is changed to the High level (whether the START condition is detected) while the SCL keeps the High level. When the STOP condition is detected, the accessory controller 201 finishes the communication. In the meantime, when the STOP condition is not detected, the accessory controller 201 determines that data will be continuously transmitted to the accessory controller 201 from the first camera controller 101 and returns the process to the step S3216.

After the process returns to the step S3216 in this way, the accessory controller 201 sequentially increments the address of the actual data to be received and receives one byte of the actual data corresponding to each address. In this way, the accessory controller 201 receives the N bytes of the actual data from the first camera controller 201 by repeatedly receiving one byte of actual data until the STOP condition is received in the step S3220.

An FNC1 signal that communicates through the contact TC14, an FNC2 signal that communicates through the contact TC15, an FNC3 signal that communicates through the contact TC16, and an FNC4 signal that communicates through the contact TC17 are function signals of which functions can be changed corresponding to the type of the accessory 200. When the accessory 200 is a microphone device, for example, the signal that communicates through the contact TC15 becomes a voice data signal. Moreover, when the accessory 200 is a lighting apparatus (a flash unit), the signal that communicates through the contact TC14 becomes a signal (flash emission timing signal) that gives a light emission timing.

It should be noted that signals that achieve different functions may communicate through the same contact in accordance with the types of the attached accessories. For example, when the accessory 200 is other than the lighting apparatus, a synchronization signal that controls a timing different from the light emission timing may communicate through the contact TC14. The contacts TC14 through TC17 are equivalent to function signal contacts. The communication using at least one of the function signal contacts is also called function signal communication. The function signal communication can be executed in parallel to the I2C communication and SPI communication at a timing irrespective of the I2C communication and SPI communication.

The accessory types are the above-mentioned microphone device, lighting apparatus, etc. Accessories like lighting apparatuses having different characteristics that achieve functions of the same object belong to the same type. Accessories, such as a microphone device and a lighting apparatus, that achieve functions of different objects belong to different types. The function signal communication is executed on the basis of the information obtained by the I2C communication or the SPI communication.

The contact TC18 as a second grand contact is also connected to GND and functions as a contact of the reference potential of the camera 100 and accessory 200 as with the contact TC04. A signal line of a differential signal D2N connected to the contact TC19 and a signal line of a differential signal D2P connected to the contact TC20 are connected to the second camera controller 102. These differential signal D2N and D2P are differential data communication signals that perform data communication as a mutual pair. For example, USB communication is available through the TC19 and TC20.

The contact TC21 is connected to GND and has not only a function as a contact of the reference potential, but also a function as a contact that controls wiring impedances of the differential signals D2N and D2P. The contact TC21 is equivalent to a fourth grand contact. The contacts TC01, TC04, TC06, TC18, and TC21 are connected to a GND section of a flexible substrate. The GND section of the flexible substrate is fixed to a metallic member of the camera 100 that keeps a GND level with a screw etc., for example. The metallic member that keeps the GND level may be an engagement member that engages with the accessory 200 in an accessory shoe part or may be a base plate (not shown) inside the camera 100.

In the embodiment, the attachment detection contact TC06 that transmits the accessory attachment detection signal/ACC_DET is arranged between the contact (first clock contact) TC07 that transmits the clock signal SCLK (first clock signal) and the contact TC05 that transmits the accessory power VACC. In general, noise (clock noise) accompanying potential fluctuation of a clock signal gets across to a contact adjacent to a contact of a clock signal, and this can cause malfunction. Particularly, its influence becomes larger in a configuration where a distance between contacts is short because there are many contacts like the embodiment. Accordingly, the arrangement of the attachment detection contact TC06 between the SCLK contact TC07 and VACC contact TC05 reduces the influence of the clock noise to the power supply voltage.

Although the accessory attachment detection signal/ACC_DET is pulled up before attachment of the accessory, it is set to the GND potential after attachment of the accessory. In the meantime, since the SCLK contact TC07 does not transmit the clock signal before attachment of the accessory, the electric potential does not fluctuate. After attachment of the accessory, the electric potential fluctuates because the clock signal is transmitted.

When the SCLK contact TC07 transmits the clock signal, the attachment detection contact TC06 is at the GND potential. Accordingly, even if the attachment detection contact TC06 is affected by the clock noise, the electric potentials of the controllers of the camera 100 and accessory 200 do not fluctuate easily, which prevents malfunction. Moreover, it reduces the clock noise that propagates to a more distant position than the attachment detection contact TC06. As a result, since it is not necessary to arrange an additional GND terminal, the influence of the clock noise is reduced without increasing the number of contacts.

Moreover, an SCL (second clock signal) as a clock signal is also transmitted to the contact (second clock contact) TC13. Since the frequency of the SCLK transmitted to the SCLK contact TC07 is higher than that of the SCL, the clock noise occurred from the SCLK contact TC07 is larger than that from the SCL contact TC13. Accordingly, the arrangement of the attachment detection contact TC06 adjacent to the SCLK contact TC07 is more effective to prevent malfunction due to the clock noise than the arrangement adjacent to the SCL contact TC13.

Furthermore, in addition to the difference in the frequency, the SCL transmitted to the SCL contact TC13 is a clock signal of an I2C communication standard, and the voltage of the signal line is driven under open drain connection and fluctuates. In the meantime, the SCLK transmitted to the SCLK contact TC07 is a clock signal of an SPI communication standard, and fluctuation of the voltage of the signal line is driven by a CMOS output and fluctuates. Accordingly, since an edge of the voltage fluctuation of the SCL contact TC13 tends to be gentle, the clock noise is hard to occur as compared with the SCLK contact TC07. Accordingly, the arrangement of the attachment detection contact TC06 adjacent to the SCLK contact TC07 is more effective to prevent malfunction due to the clock noise than the arrangement adjacent to the SCL contact TC13.

Moreover, the clock signal may be transmitted by transmitting differential signals D1N and D1P to the first and second differential signal contacts TC19 and TC20 as a pair. In such a case, a clock signal (third clock signal) whose frequency is higher than that of the SCLK and SCL may be transmitted. However, since the differential signals D1N and D1P are pair signals, dissipation of the clock noise is less than that from the SCLK contact TC07 and SCL contact TC13 that transmit single end signals. Accordingly, the arrangement of the attachment detection contact TC06 adjacent to the SCLK contact TC07 is more effective to prevent malfunction due to the clock noise than the arrangement adjacent to the first and second differential signal contacts TC19 and TC20.

It should be noted that the contact (first data contact) TC08 arranged adjacent to the SCLK contact TC07 at the opposite side of the attachment detection contact TC06 transmits the MOSI (a first data signal). Since the MOSI is a data signal, it seems to be easily affected by the clock noise. However, since the MOSI is the data signal of the same SPI communication standard as the clock signal transmitted through the SCLK contact TC07, the fluctuation timing of electric potential synchronizes with the clock signal, and it is not easily affected by the clock noise. Accordingly, the contact TC08 is not necessary to fix to the GND potential and can be used as an MOSI contact.

The accessory 200 has the battery 205 and receives the power supply from the battery 205 and also receives the power supply from the camera 100 through the camera-side connector 141 and the accessory-side connector 211. The accessory controller 201 consists of a microcomputer which contains a CPU etc., and controls the entire accessory 200.

The accessory power source 202 consists of a DCDC converter, an LDO, or a charge pump, and generates electric power to be supplied to sections of the accessory 200. The voltage of 1.8V generated by the accessory power source 202 is usually supplied to the accessory controller 201 as accessory microcomputer power VMCU_A. It should be noted that the voltage generated by the accessory power source 202 may be different from 1.8V. The accessory controller 201 controls ON/OFF of the power supply to sections of the accessory 200 by controlling the accessory power source 202.

A charge unit 204 charges the battery 205 using the electric power supplied from the camera 100. When determining that electric power sufficient to charge is supplied from the camera 100, the accessory controller 201 controls the charge unit 204 to charge the battery 205. Although the case where the accessory 200 is equipped with the battery 205 is described in the embodiment, the accessory 200 may operate only by the power supply from the camera 100 without the battery 205. In this case, the charge unit 204 becomes unnecessary.

A differential communication unit 207 is a circuit for performing differential communication with the camera 100 and can transmit and receive data with the camera 100. An external communication I/F 208 is an I/F (interface) for data communication with an external apparatus (not shown), and may be an Ethernet communication IF, a wireless LAN communication IF, a public network communication IF, etc.

The accessory controller 201 transmits data received from the camera 100 and transmits data received from an external apparatus to the camera by controlling the differential communication unit 207 and the external communication I/F 208. A function unit 206 is a circuit that exhibits one of different functions corresponding to the type of the accessory 200. For example, when the accessory 200 is a flash device, an emission unit and a charge unit, etc. exist inside the function unit 206. Moreover, when the accessory 200 is a microphone device, a voice codec unit, a microphone, etc. exist inside the function unit 206.

An external connection terminal 209 is a connector terminal for connecting with an external apparatus and is a USB TYPE-C connector as an example, but it is not limited to this. A connection detection unit 210 detects that an external apparatus is connected to the external connection terminal 209. The accessory controller 201 can detect the connection of the external apparatus to the external connection terminal 209 by receiving the output signal of the connection detection unit 210. A power switch 203 used to turn ON or OFF the operation of the accessory 200. The accessory controller 201 can detect an on-position and an off-position by reading the signal level of the terminal to which the power switch 203 is connected.

An operation switch 212 is a handler for a user to operate the accessory 200, and consists of a button, a cross key, a slide switch, a dial switch, a touch sensor, etc. When detecting an operation of the operation switch 212, the accessory controller 201 executes a predetermined process corresponding to the operation.

The accessory-side connector 211 is electrically connectable with the camera 100 through twenty-one contacts TA01 through TA21 arranged on a line. The contacts TA01 through TA21 are arranged in this order from one end in the arrangement direction to the other end.

The contact TA01 is connected to GND and has not only a function as a contact of the reference potential, but also a function as a contact that controls wiring impedances of the differential signals D1N and D1P. The contact TA01 is equivalent to a third grand contact.

The differential signal D1N that communicates through the contact TA02 and the differential signal D1P that communicates through the contact TA03 are data communication signals that perform data communication as a mutual pair. The contacts TA02 and TA03 are connected with the differential communication unit 207. The contacts TA02, TA03, TA07 through TA17, TA19, and TA20 are communication contacts.

The contact TA04 as a first grand contact is connected to GND and functions as a contact of the reference potential of the camera 100 and accessory 200. The contact TA04 is arranged at the outer position of the contact TA0S in the arrangement direction of the contacts. The contact TA0S as a power-source contact is connected to the accessory power source 202 and charge unit 204. The accessory power VACC supplied from the camera 100 is also connected to the contact TA0S.

The contact TA06 as an attachment detection contact is directly connected to the GND. The contact TC06 makes the camera 100 detect the attachment of the accessory 200 when the accessory 200 is attached to the camera 100 by setting the accessory attachment detection signal/ACC_DET to the GND level (ground potential) as the Low level.

The SCLK that communicates through the contact TA07, the MOSI that communicates through the contact TA08, the MISO that communicates through the contact TA09, and the CS that communicates through the contact TA10 are the signals for the SPI communication in which the accessory controller 201 becomes a communication secondary.

The communication request signal/WAKE for requesting communication from the camera 100 from the accessory controller 201 is transmitted through the contact TA11. When determining that the communication with the camera 100 is necessary, the accessory controller 201 issues the communication request to the camera 100 by outputting the Low level of the communication request signal/WAKE.

In response to detection of the attachment state of the accessory 200, the electric power is supplied to the accessory 200 from the first camera controller 101 through the contact TC5. Then, the accessory controller 201 notifies the first camera controller 101 that the electric power is supplied by changing the signal level (electric potential) of the communication request signal/WAKE from the High level to the Low level.

The accessory controller 201 notifies the first camera controller 101 that a factor that the accessory 200 needs communication with the camera 100 occurs by changing the signal level (electric potential) of the communication request signal/WAKE from the High level to the Low level without receiving the request from the camera 100. This configuration enables the first camera controller 101 to omit a cyclical check operation with polling to check whether a factor that the accessory 200 needs communication occurs. Moreover, when a factor that needs communication occurs, the accessory 200 can notify the camera 100 of such a state in real time.

The SDA that communicates through the contact TA12 and the SCL that communicates through the contact TA13 are signals for the I2C communication in which the accessory controller 201 becomes the communication secondary.

The FNC1 signal that communicates through the contact TA14, the FNC2 signal that communicates through the contact TA15, the FNC3 signal that communicates through the contact TA16, and the FNC4 signal that communicates through the contact TA17 are function signals whose functions can be changed corresponding to the type of the accessory 200. These function signals are voice data signals when the accessory 200 is a microphone device. When the accessory 200 is a flash unit, the function signals are flash emission timing signals that notify of a light emission timing.

The contact TA18 as a second grand contact is also connected to GND and functions as a contact of the reference potential of the camera 100 and accessory 200 as with the TA04. A signal line of a differential signal D2N connected to the contact TA19 and a signal line of a differential signal D2P connected to the contact TA20 are connected to the external connection terminal 209. These differential signal D2N and D2P are differential data communication signals that perform data communication as a mutual pair.

The contact TA21 is connected to GND and has not only a function as a contact of the reference potential, but also a function as a terminal that controls wiring impedances of the differential signals D2N and D2P. The contact TA21 is equivalent to a fourth grand contact.

The contacts TA01, TA04, TA06, TA18, and TA21 are connected to a GND section of a flexible substrate. The GND section of the flexible substrate is fixed to a metallic member of the accessory 200 that keeps a GND level with a screw etc., for example. The metallic member that keeps the GND level is a shoe mounting leg that is engaged with the accessory shoe part of the camera 100*a* or a base plate (not shown) inside the accessory 200.

In the embodiment, the camera 100 and the accessory 200 support two kinds of communication protocols as the SPI communication methods. Among these, a first communication protocol is a method that does not check whether the accessory 200 is in a communication available state before the camera 100 outputs a SCLK signal. This is called a first SPI protocol in the embodiment. A second communication protocol is a method that checks whether the accessory 200 is in the communication available state before the camera 100 outputs a SCLK signal. This is called a second SPI protocol in the embodiment.

The camera 100 may be provided with built-in accessories, such as a built-in microphone and a built-in flash, for example. The number of the built-in accessories does not matter.

FIG. 2A is a chart schematically showing a communication waveform of the first SPI protocol. FIG. 2B is a chart schematically showing a communication waveform of the second SPI protocol. In FIG. 2A and FIG. 2B, the CS signal shall be active in the Low level.

As shown in FIG. 2A, in the first SPI protocol, the second camera controller 102 issues a request of the SPI communication to the accessory controller 201 by changing the CS signal to the Low level at a timing A1.

After a predetermined period T_CS elapses from the timing A1, the second camera controller 102 starts to output the SCLK signal and MOSI signal at a timing A2. Similarly, when detecting falling change of the SCLK signal, the accessory controller 201 starts to output the MISO signal.

The second camera controller 102 stops the SCLK output at a timing A3 at which the SCLK output of one byte is completed. The second camera controller 102 stops the SCLK output until a predetermined period T_INTERVAL elapses from the timing A3, and restarts the SCLK output to perform next one-byte communication at a timing A4 at which the predetermined period T_INTERVAL elapses.

Figure 3A:
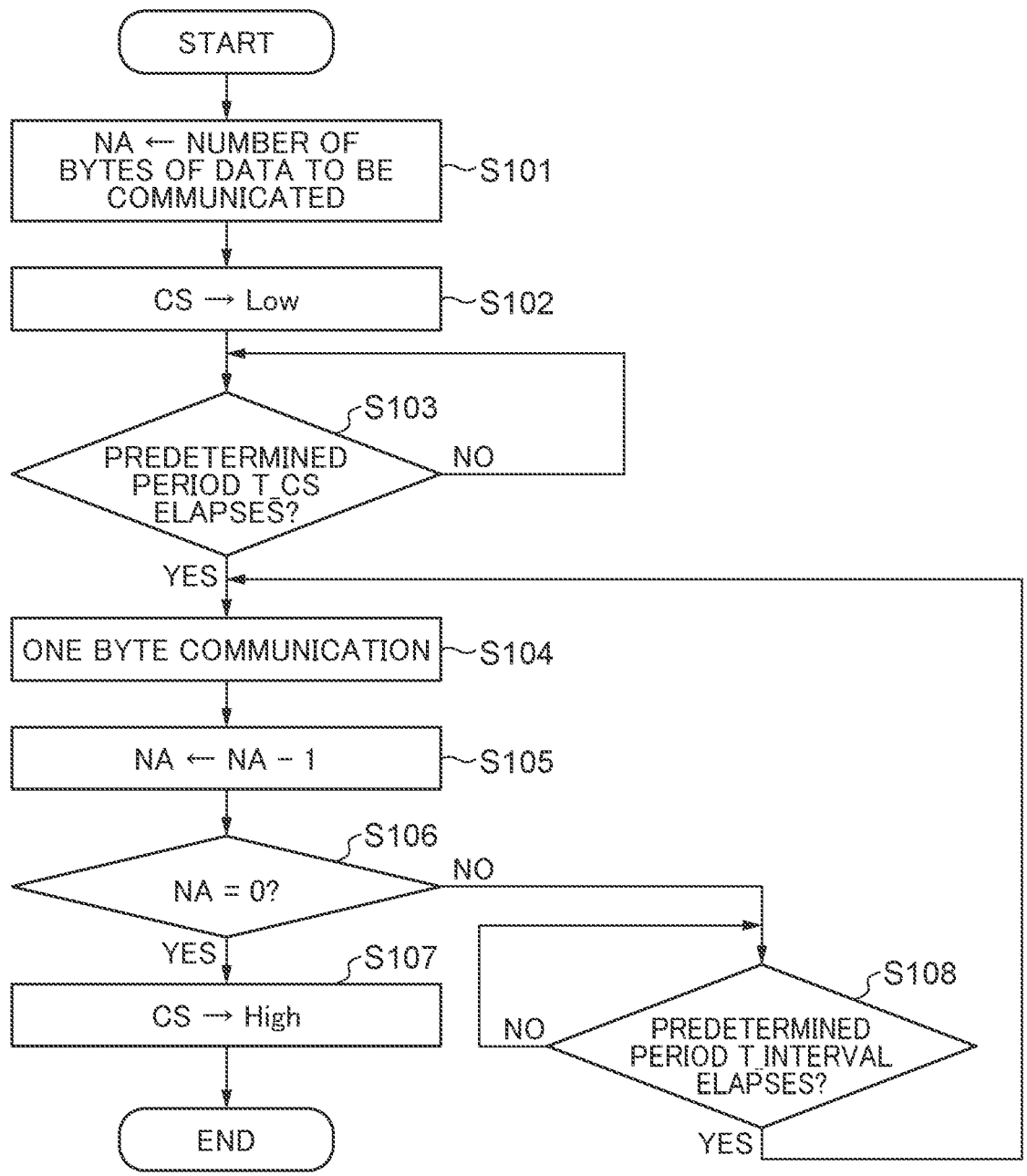
FIG. 3A and FIG. 3B are flowcharts respectively showing a process of a second camera controller and a process of an accessory controller with the first SPI protocol.

FIG. 3A is a flowchart showing a process of the second camera controller 102 with the first SPI protocol. This process is achieved when the CPU in the second camera controller 102 develops and runs a program stored in a ROM (not shown) in the second camera controller 102 to a RAM (not shown) in the second camera controller 102.

In a step S101, the second camera controller 102 stores the number of bytes of data to communicate into a variable NA. For example, when three bytes of the data will be communicated, the number "3" is stored into the variable NA. In a step S102, the second camera controller 102 changes the CS signal to the Low level to request the SPI communication.

In a step S103, the second camera controller 102 waits until the predetermined period T_CS elapses after the CS signal varies to the Low level. When the predetermined period T_CS elapses, the process proceeds to a step S104. In the step S104, the second camera controller 102 controls the output of the SCLK for one-byte data communication and controls the output of the MOSI data and input of the MISO data.

In a step S105, the second camera controller 102 decrements the variable NA by one. In a step S106, the second camera controller 102 determines whether the variable NA is zero. When the variable NA is zero, the second camera controller 102 proceeds with the process to a step S107. When the variable NA is not zero, the process proceeds to a step S108.

In the step S108, the second camera controller 102 waits until the predetermined period T_INTERVAL elapses after the one-byte data communication in the step S104 is completed. When the predetermined period T_INTERVAL elapses, the process returns to the step S104. The second camera controller 102 changes the CS signal to the High level in the step S107 and finishes the series of the SPI communication shown in FIG. 3A.

Figure 3B:
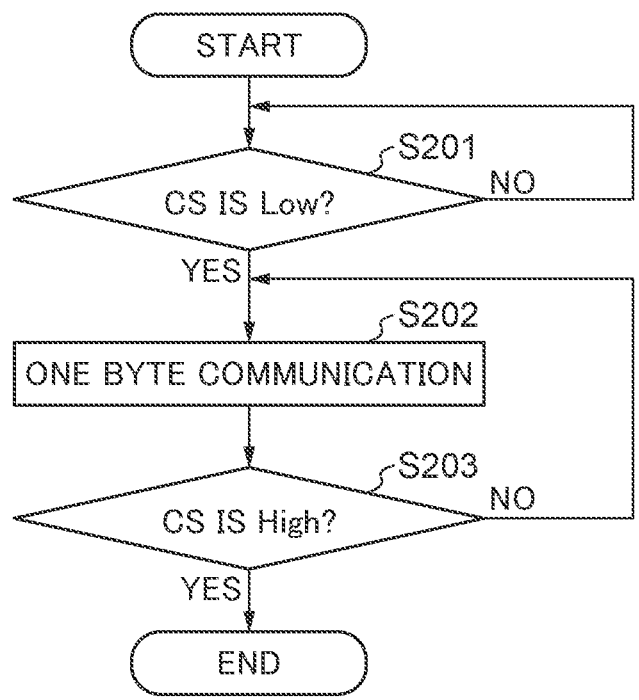

FIG. 3B is a flowchart showing a process of the accessory controller 201 with the first SPI protocol. This process is executed in parallel to the process shown in FIG. 3A. This process is achieved when the CPU in the accessory controller 201 develops and runs a program stored in the ROM (not shown) in the accessory controller 201 to the RAM (not shown) in the accessory controller 201.

The accessory controller 201 waits until the CS signal becomes Low in a step S201. When the CS signal becomes Low, the process proceeds to a step S202. In the step S202, the accessory controller 201 performs one-byte data communication by controlling input of the MOSI data and output of the MISO data in response to the input of the SCLK signal.

In a step S203, the accessory controller 201 determines whether the CS signal is High. When the CS signal is not High, the accessory controller 201 returns the process to the step S202 for the next one-byte communication. When the CS signal is High, the accessory controller 210 finishes a series of SPI communication shown in FIG. 3B.

Next, the second SPI protocol will be described. As shown in FIG. 2B, in the second SPI protocol, the second camera controller 102 requests the accessory controller 201 to perform the SPI communication by changing the CS signal to the Low level at a timing B1. The second camera controller 102 checks the electric potential of the MISO signal in parallel to the communication request. When the MISO signal is the High level, the second camera controller 102 determines that the accessory controller 201 is communicable. When the MISO signal is the Low level, the second camera controller 102 determines that the accessory controller 201 is not communicable.

In the meantime, when detecting a falling change of the CS signal in the state where the SPI communication is available, the accessory controller 201 controls the MISO signal to the High level. When detecting the falling change in the state where the SPI communication is unavailable, the accessory controller 201 controls the MISO signal to the Low level (a timing B2).

When confirming that the MISO signal is the High level, the second camera controller 102 starts to output the MISO signal and the SCLK signal at a timing B3. Similarly, when detecting falling change of the SCLK signal, the accessory controller 201 starts to output the MISO signal.

When the SCLK output of one byte is completed, the second camera controller 102 stops the SCLK output at a timing B4. After performing the one-byte data communication, when the SPI communication is available, the accessory controller 201 controls the MISO signal to the High level. When the SPI communication is unavailable, the accessory controller 201 controls the MISO signal to the Low level (timings B5 and B6).

The second camera controller 102 checks the electric potential of the MISO signal at a timing B7. Then, it determines that the second camera controller 102 is in the state where the accessory controller 201 can communicate if a MISO signal is a High level, and if a MISO signal is a Low level, it will be determined that it is in the state where the accessory controller 201 cannot communicate.

Figure 4A:
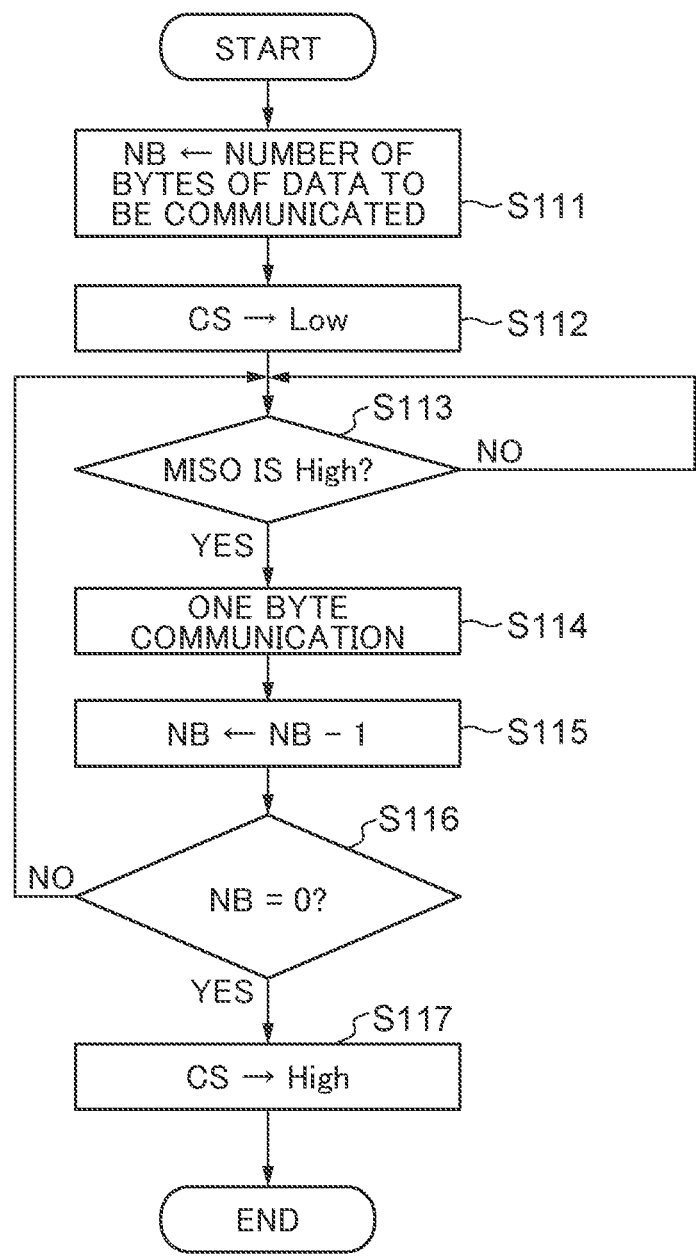
FIG. 4A and FIG. 4B are flowcharts respectively showing a process of the second camera controller and a process of the accessory controller with the second SPI protocol.

FIG. 4A is a flowchart showing a process of the second camera controller 102 with the second SPI protocol. This process is achieved when the CPU in the second camera controller 102 develops and runs a program stored in the ROM (not shown) in the second camera controller 102 to the RAM (not shown) in the second camera controller 102.

In a step S111, the second camera controller 102 stores the number of bytes of data to communicate into a variable NB. For example, when three bytes of the data will be communicated, the number "3" is stored into the variable NB. In a step S112, the second camera controller 102 changes the CS signal to the Low level to request the SPI communication. In a step S113, the second camera controller 102 waits until the MISO signal becomes the High level. When the MISO signal becomes the High level, the process proceeds to a step S114.

In the step S114, the second camera controller 102 controls the output of the SCLK for one-byte data communication and controls the output of the MOSI data and input of the MISO data. In a step S115, the second camera controller 102 decrements the variable NB by one. In a step S116, the second camera controller 102 determines whether the variable NB is zero (whether the communication of all the data is completed). When the variable NB is zero, it is determined that the communication of all the data is completed.

When the communication of all the data is completed, the second camera controller 102 proceeds with the process to a step S117. When the communication of at least a part of data is not completed, the second camera controller 102 returns the process to the step S113. The second camera controller 102 changes the CS signal to the High level in the step S117 and finishes the series of the SPI communication shown in FIG. 4A.

Figure 4B:
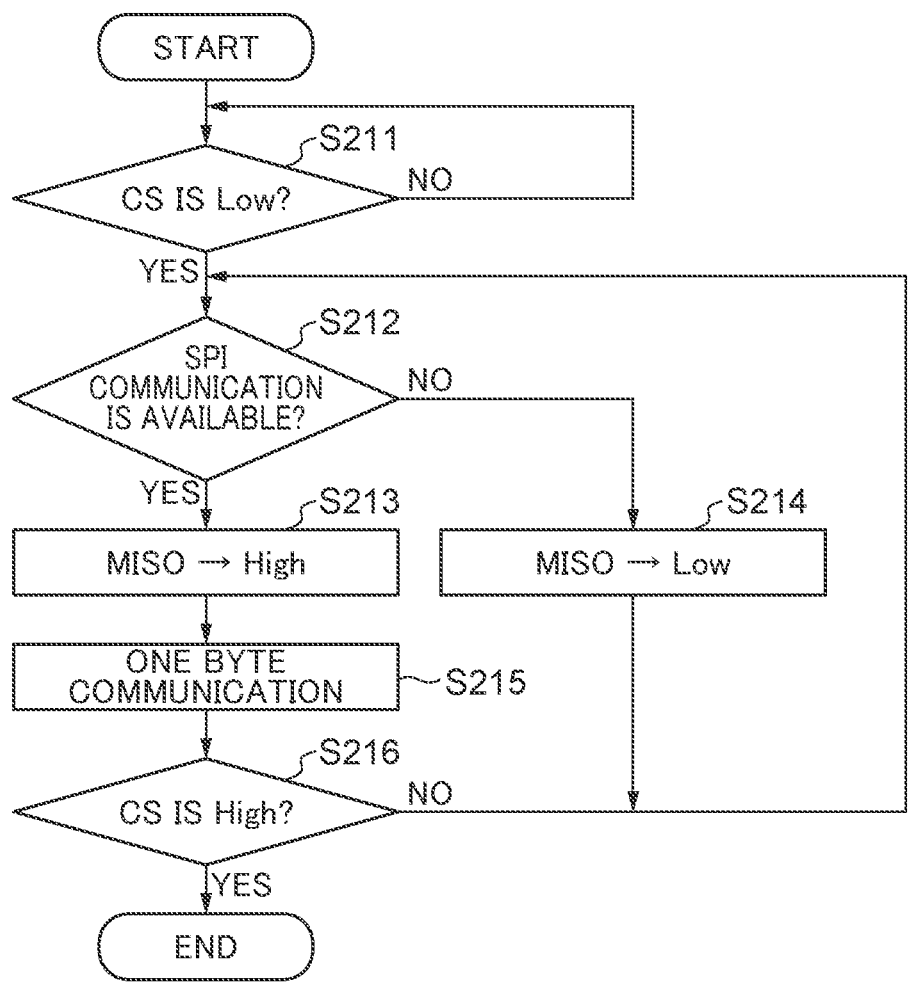

FIG. 4B is a flowchart showing a process of the accessory controller 201 with the second SPI protocol. This process is executed in parallel to the process shown in FIG. 4A. This process is achieved when the CPU in the accessory controller 201 develops and runs a program stored in the ROM (not shown) in the accessory controller 201 to the RAM (not shown) in the accessory controller 201.

The accessory controller 201 waits until the CS signal becomes Low in a step S211. When the CS signal becomes Low, the process proceeds to a step S212. In the step S212, the accessory controller 201 determines whether the SPI communication is available. When the SPI communication is available, the process proceeds to a step S213. When the SPI communication is unavailable, the process proceeds to a step S214.

The accessory controller 201 controls the MISO signal to the High level in the step S213 and proceeds with the process to a step S215. The accessory controller 201 controls the MISO signal to the Low level in the step S214 and returns the process to the step S212. In the step S215, the accessory controller 201 performs one-byte data communication by controlling input of the MOSI data and output of the MISO data in response to the input of the SCLK signal.

In a step S216, the accessory controller 201 determines whether the CS signal is High. When the CS signal is not High, the accessory controller 201 returns the process to the step S202 for the next one-byte communication. When the CS signal is High, the accessory controller 210 finishes the SPI communication shown in FIG. 4B.

FIG. 5 is a view showing communication contents of an operation execution instruction (command) transmitted from the camera 100 to the accessory 200 by the SPI communication.

In communication of a first byte, the second camera controller 102 transmits information CMD that shows a command number as the MOSI data. In the meantime, the accessory controller 201 transmits a value of "0xA5" as information showing that it is in the communication available state as the MISO data. If the accessory controller 201 cannot execute the communication process of the first byte, a value other than "0xA5" is transmitted as the MISO data.

In communication of a second byte, the second camera controller 102 transmits an argument MOSI_DATA1 corresponding to the command number CMD. In communication of a third byte through an (N−2)th byte, the second camera controller 102 transmits arguments MOSI_DATA2 through MOSI_DATA[N−3] corresponding to the command number CMD in the similar manner.

In the meantime, in the communication of the second byte, the accessory controller 201 transmits the command number CMD received in the communication of the first byte as the MISO data. Thereby, the second camera controller 102 can determine that the accessory controller 201 has received the MOSI data correctly.

In the communication of the third byte, the accessory controller 201 transmits a return value MISO_DATA1 corresponding to the command number CMD as the MISO data. In communication of the fourth byte through the (N−2)th byte, the accessory controller 201 transmits return values MISO_DATA2 through MISO_DATA[N−4] corresponding to the command number CMD in the similar manner. It should be noted that the number of the arguments and the number of the return values are beforehand determined for each command number. Moreover, one of an argument and a return value may be omitted.

In communication of an (N−1)th byte, the second camera controller 102 transmits checksum data "CheckSum_C" as the MOSI data. The second camera controller 102 calculate the "CheckSum_C" by the following Formula 1 from the data that is transmitted to the accessory controller 201 from the second camera controller 102. In the meantime, the accessory controller 201 transmits a value "0x00" as the MISO data.

In communication of a Nth byte, the second camera controller 102 transmits a value "0x00" as the MOSI data. In the meantime, the accessory controller 201 transmits checksum data "CheckSum_A" as the MISO data.

The "CheckSum_A" is calculated by the following Formula 2 or the following Formula 3. That is, the accessory controller 201 calculates the "CheckSum_A" from the actually received data. Then, the accessory controller 201 determines whether the received "CheckSum_C" matches the "CheckSum_A" calculated by the formula 2 from the receive data. When the "CheckSum_C" matches the "CheckSum_A", the accessory controller 201 transmits the "CheckSum_A" calculated by the following formula 2 to the second camera controller 102.

In the meantime, when determining that the "CheckSum_C" does not match the "CheckSum_A", the accessory controller 201 transmits the "CheckSum_A" calculated by the following formula 3 to the second camera controller 102.

$$\text{CheckSum\_C}=\text{EXOR}(\text{AND}(\text{SUM}(\text{CMD}, \text{MOSI\_DATA1}, \ldots, \text{MOSI\_DATA}[N-3]), 0xFF), 0xFF) \quad \text{Formula 1}$$

$$\text{CheckSum\_A}=\text{EXOR}(\text{AND}(\text{SUM}(0xA5, \text{CMD}, \text{MISO\_DATA1}, \text{MOSI\_DATA}[N-4]), 0xFF), 0xFF) \quad \text{Formula 2}$$

$$\text{CheckSum\_A}=\text{AND}(\text{SUM}(0xA5, \text{CMD}, \text{MISO\_DATA1}, \text{MOSI\_DATA}[N-4]), 0xFF) \quad \text{Formula 3}$$

FIG. 6 is a view showing an example of accessory information. The accessory information is stored in a non-volatile memory (not shown) in the accessory 200. The accessory information is used when the camera 100 identifies the type of the accessory 200 and identifies the specifications about the communication and the operation (function) of the accessory 200. The accessory information is mapped to a memory space of addresses "0x00" through "0x0F". The accessory information can be read from the accessory 200 by the I2C communication. It should be noted that the check sum value corresponding to the read data shall be added as final data of communication in the I2C communication in the embodiment.

As shown in FIG. 6, data in D7 through D0 of an address "0x00" is information that shows an accessory type (ACC type). Data in D7 through D0 data of an address "0x01" is information that shows an identification number (ACC identification number) of an accessory. An accessory type is uniquely identified by the accessory type information and the identification number. Data in D7 through D0 of an address "0x02" is information that shows a version of firmware of the accessory 200.

Data in D7 and D6 of an address "0x03" is information that shows whether the power supply of the accessory power VACC to the accessory 200 is required in a state where a power switch (not shown) of the camera 100 is set to OFF. When this information is "0", the power supply is unnecessary. When this information is "1", the power supply from the first accessory-directed power source 131 is required. When this information is "2", the power supply from the second accessory-directed power source 132 is required.

Data in D5 and D4 of the address "0x03" is information that shows whether the power supply of the accessory power VACC to the accessory 200 is required in a state where the camera 100 is in a power save mode (an automatic off mode). When this information is "0", the power supply is unnecessary. When this information is "1", the power supply from the first accessory-directed power source 131 is required. When this information is "2", the power supply from the second accessory-directed power source 132 is required.

Data in D3 and D2 of the address "0x03" is information that shows whether the accessory 200 has the battery 205. When this information is "0", it is shown that the accessory 200 does not have the battery 205. When this information is "1", it is shown that the accessory 200 has the battery 205. Data in D1 and D0 of the address "0x03" is information that shows whether the accessory 200 supports a charge function to the battery 205. When this information is "0", it is shown that the accessory 200 does not support the charge function. When this information is "1", it is shown that the accessory 200 supports the charge function.

Data in D7 through D0 of an address "0x04" is information that shows the required power to the accessory power VACC that is supplied to the accessory 200 from the camera 100. For example, a value that is obtained by increasing a value of this information by ten times shows an electric current value. When this information is "10", it is shown that the electric current value is 100 mA. When this information is "100", it is shown that the electric current value is 1A. Furthermore, this information may be associated with an arbitrary current value as a method of reducing a data amount of this information. For example, the values "0", "1", "3", and "4" of this information respectively show the required powers of 100 mA, 300 mA, 450 mA, and 600 mA.

Data in D7 of an address "0x05" is information that shows whether the accessory 200 is in a firmware update mode.

When this information is "0", it is shown that the accessory 200 is not in the firmware update mode. When this information is "1", it is shown that the accessory 200 is in the firmware update mode. Data in D6 of the address "0x05" is information that shows whether the accessory 200 has a firmware update function. When this information is "0", it is shown that the accessory 200 does not have the firmware update function. When this information is "1", it is shown that the accessory 200 has the firmware update function.

Data in D5 and D4 of the address "0x05" is information that shows whether an operation in a state where the accessory 200 is equipped with an intermediate connection accessory is permitted. When this information is "0", it is shown that the operation is not permitted. When this information is "1", it is shown that the operation is permitted. Data in D3 and D2 of the address "0x05" is information that shows whether the accessory 200 needs to confirm an attachment state of an intermediate connection accessory on startup of the camera 100. When this information is "0", it is shown that the confirmation is not needed. When this information is "1", it is shown that the confirmation is needed.

Data in D1 and D0 of the address "0x05" is information that shows whether the accessory 200 supports a command notification by the I2C communication. When this information is "0", it is shown that the command notification is not supported. When this information is "0", it is shown that the command notification is supported.

Data in D5 and D4 of an address "0x06" is information that shows the communication method that can notify the camera 100 of a factor of communication request after the accessory 200 notifies the camera 100 of the communication request signal/WAKE. When this information is "0", it is shown that the I2C communication is available. When this information is "1", it is shown that the SPI communication is available. And when this information is "2", it is shown that both the I2C communication and the SPI communication are available.

Data in D0, D1, D2, and D3 of the address "0x06" are pieces of information that show whether the accessory 200 has the functions of the FNC1 signal, FNC2 signal, FNC3 signal, and FNC4 signal, respectively. The data in D0 corresponds to the FNC1 signal. The data in D1 corresponds to the FNC2 signal. The data in D2 corresponds to the FNC3 signal. The data in D3 corresponds to the FNC4 signal. When each of the data values is "0", it is shown that the accessory 200 does not have the corresponding function. When each of the data values is "1", it is shown that the accessory 200 has the corresponding function.

Data in D7 of an address "0x0A" is information that shows whether the accessory 200 issues a startup request to the camera 100 when the accessory 200 notifies the camera of the communication request signal/WAKE. When this information is "0", it is shown that the accessory 200 does not issue the startup request. When this information is "1", it is shown that the accessory 200 issues the startup request.

Data in D6 through D0 of the address "0x0A" is information that shows a factor of the communication request signal/WAKE that is transmitted to the camera 100 from the accessory 200.

Data in D1 of an address "0x0C" is information that shows the SPI communication protocol that is supported by the accessory 200. When this information is "0", it is shown that the accessory 200 supports the first SPI protocol. When this information is "1", it is shown that the accessory 200 supports the second SPI protocol.

Data in D0 of the address "0x0C" is information that shows a control logic of the CS signal in the SPI communication that is supported by the accessory 200. When this information is "0", it is shown that the CS signal follows a Low active logic. When this information is "1", it is shown that the CS signal follows a High active logic.

Data in D7 through D0 of an address "0x0D" is information that shows a period required as a communication byte interval in a case where the accessory 200 communicates with the first SPI protocol and where the data in D7 of the address "0x05" is "0". When the data in D7 of the address "0x05" is "0", the accessory 200 is not in the firmware update mode as mentioned above.

Data in D7 through D0 of an address 0x0E is information that shows a period required as a communication byte interval in case where the accessory 200 communicates with the first SPI protocol and where the data in D7 of the address "0x05" is "1". When the data in D7 of the address "0x05" is "1", the accessory 200 is in the firmware update mode as mentioned above.

Data in D7 through D0 of an address "0x0F" shown in FIG. 6 is information that shows the checksum.

Figure 7:
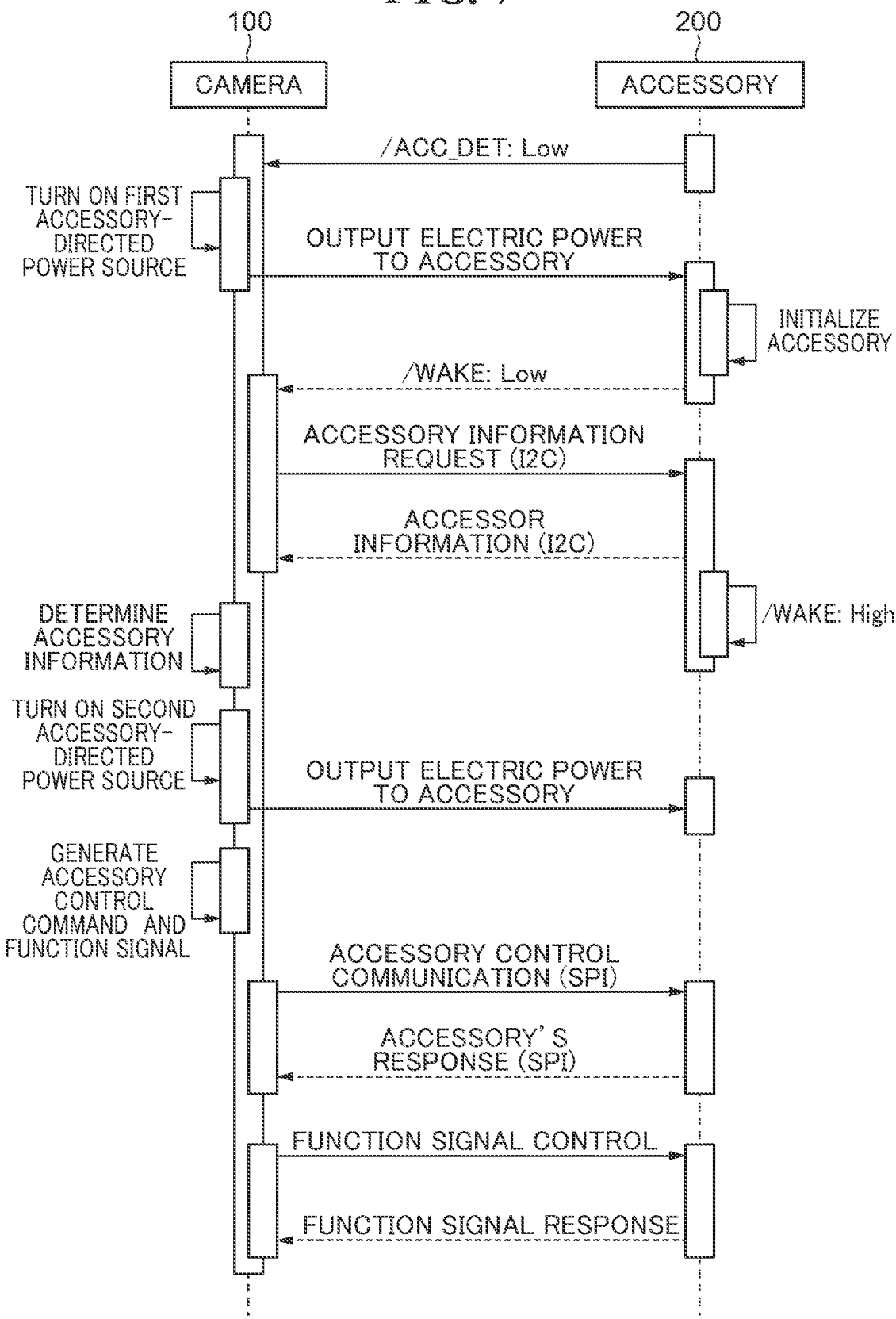
FIG. 7 is a view showing a sequence of a time when the accessory is attached to the camera.

FIG. 7 is a view showing a sequence of a time when the accessory 200 is attached to the camera 100. In the following description, communication between the camera 100 and accessory 200 is schematically described. Details are mentioned later.

When the accessory 200 is attached to the camera 100, the accessory attachment detection signal/ACC_DET becomes the GND level (Low level), and the first camera controller 101 determines that the accessory 200 is attached. When determining that the accessory 200 is attached, the first camera controller 101 sets the power control signal CNT_VACC1 to the High level to turn on the first accessory-directed power source 131. The first accessory-directed power source 131 outputs the accessory power VACC when the power control signal CNT_VACC1 becomes High.

In the accessory 200, when receiving the accessory power VACC, the accessory power source 202 generates the electric power VMCU_A for the accessory controller 201. Thereby, the accessory controller 201 starts. The accessory controller 201 initializes blocks in the accessory 200 after startup. After that, when the communication with the camera 100 is available, the accessory controller 201 sets the communication request signal/WAKE to the Low level. In the camera 100, when detecting that the communication request signal/WAKE becomes the Low level, the first camera controller 101 detects that the accessory 200 comes into a communicable state.

The first camera controller 101 requests the accessory information from the accessory 200 by the I2C communication. In the accessory 200, the accessory controller 201 transmits the accessory information in response to the accessory information request from the camera 100. The accessory controller 201 sets the communication request signal/WAKE to the High level after transmitting the accessory information.

In the camera 100, the first camera controller 101 analyzes the received accessory information and determines whether the attached accessory 200 is controllable. Moreover, the first camera controller 101 turns ON the second accessory-directed power source 132. When various settings of the camera 100 are completed, the first camera controller 101 notifies the second camera controller 102 of the accessory information.

On the basis of the accessory type information (ACC type information) that shows the type of the accessory, the second camera controller 102 notifies the accessory 200 of a control command by the SPI communication in response to a received event and controls the function signals. The accessory controller 201 responds (transmits an event) to the control command from the camera 100 by the SPI communication, and controls the accessory 200 according to the function signals.

FIG. 8 is a view showing examples of the accessory type information set in D7 through D0 of the address "0x00" in FIG. 6. As shown in FIG. 8, each number corresponds to a type of an accessory. For example, the numbers "0x81", "0x82", "0x83", and "0x84" respectively show that accessories are a flash device, an interface conversion adapter device, a microphone device, and a multiple accessory connection adapter device. In the description, an adapter device is an intermediate accessory that is attached between the camera 100 and an accessory (a flash device, a microphone device, or the like). The interface conversion adapter device converts an interface in order to give compatibility between the camera 100 and the accessory that have different interfaces. The multiple accessory connection adapter device is used to attach a plurality of accessories to the camera 100.

FIG. 9 is a view showing examples of factors of the communication request signal/WAKE set in D6 through D0 of the address "0x0A" in FIG. 6. FIG. 9 shows the examples when the accessory 200 is a microphone device. For example, the factor number "0x00" shows that a menu call switch (SW) among the operation switch 212 is pressed. Moreover, the factor number "0x01" shows that the accessory 200 completed output control of an audio signal. Moreover, the factor number "0x02" shows that the accessory 200 completed a mute process of an audio signal. In this way, the camera 100 can be notified of the information about a generation factor of a communication request signal/WAKE.

FIG. 10A is a view showing examples of communication intervals between communication bytes that are set in the address "0x0D" in FIG. 6. FIG. 10B is a view showing examples of communication intervals between communication bytes that are set in the address "0x0E" in FIG. 6.

Figure 11:
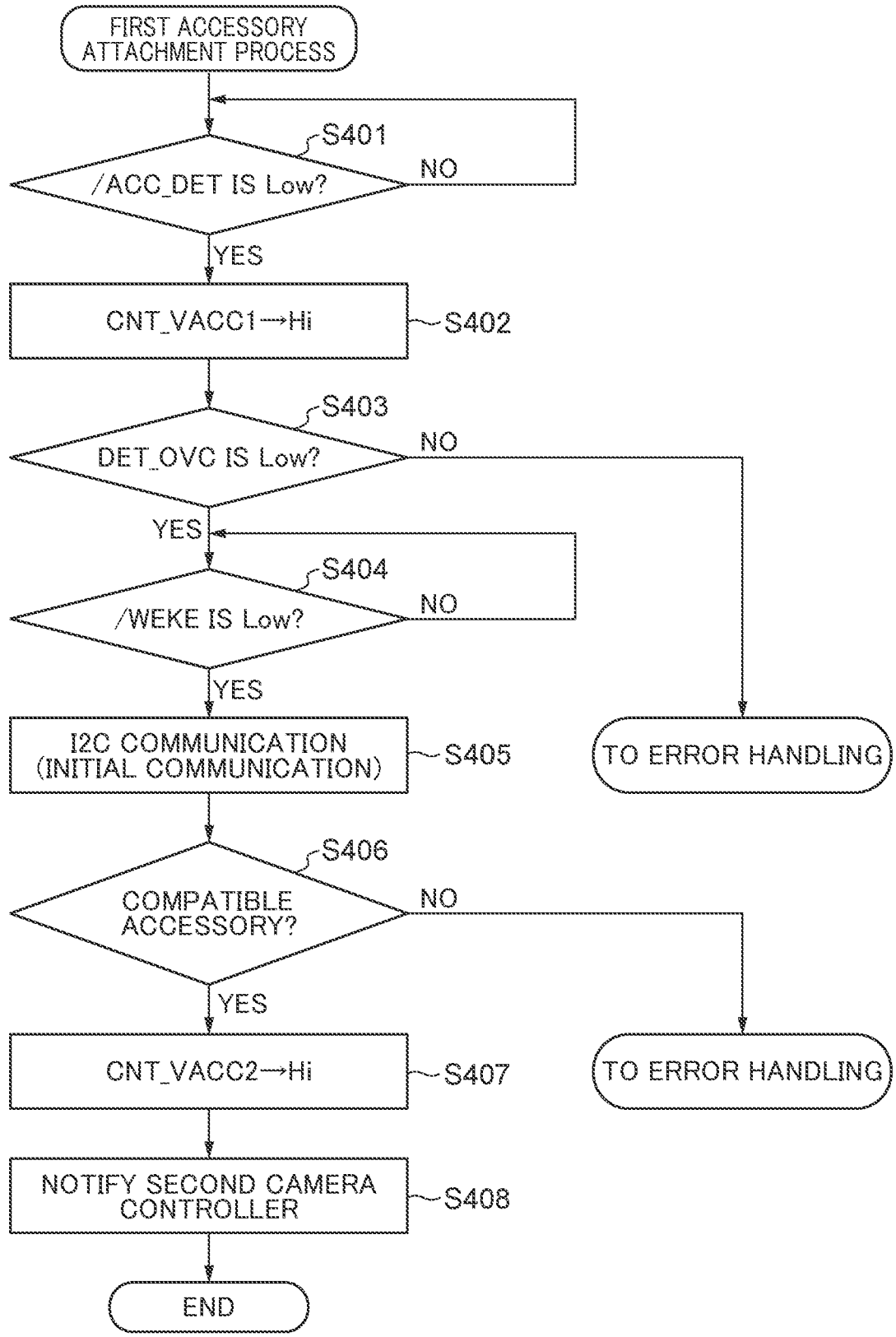
FIG. 11 is a flowchart showing a first accessory attachment process.

FIG. 11 is a flowchart showing a first accessory attachment process executed by the camera 100. The flowchart shows the process by the first camera controller 101 executed until the accessory 200 is attached to the camera 100 and the function of the accessory 200 becomes available. The first accessory attachment process is achieved when the CPU in the first camera controller 101 develops and runs a program stored in the ROM (not shown) in the first camera controller 101 to the RAM (not shown) in the first camera controller 101. This process is started when the main power supply of the camera 100 is turned ON or when the camera 100 is returned from the automatic off mode (power save mode).

In a step S401, the first camera controller 101 monitors the signal level of the accessory attachment detection signal/ACC_DET and waits until this signal level becomes Low. That is, the first camera controller 101 waits until the accessory 200 is attached. When the signal level of the accessory attachment detection signal/ACC_DET is High, it is determined that the accessory 200 is not attached. When the signal level is Low, it is determined that the accessory 200 is attached and the first camera controller 101 proceeds with the process to a step S402.

In the step S402, the first camera controller 101 controls the power control signal CNT_VACC1 to the High level to turn ON the first accessory-directed power source 131.

Then, the process proceeds to a step S403. When the power control signal CNT_VACC1 becomes High, the first accessory-directed power source 131 outputs the accessory power VACC.

In the step S403, the first camera controller 101 monitors the signal level of the overcurrent detection signal DET_OVC and determines whether this signal level is Low. When the above-mentioned signal level is Low, the process proceeds to a step S404 because the first camera controller 101 can determine that overcurrent does not flow. In the meantime, when the signal level is High, the first camera controller 101 can determine that overcurrent flows. In such a case, the first camera controller 101 finishes the process shown in FIG. 11 and proceeds with the process to error handling.

In the step S404, the first camera controller 101 monitors the signal level of the communication request signal/WAKE, which is a notification signal from the accessory 200, and waits until the signal level becomes Low (i.e., until initialization of the accessory 200 is completed). When the above-mentioned signal level becomes Low, the process proceeds to a step S405 because the first camera controller 101 can determine that the initialization of the accessory 200 is completed.

If the signal level of the communication request signal/WAKE does not become Low during a predetermined period in the step S404, the process may proceed to error handling (not shown). In the error handling, the first camera controller 101 notifies a user that the attached accessory 200 cannot be used validly by a display message or a voice.

In the step S405, the first camera controller 101 performs the I2C communication with the accessory 200 as initial communication and reads the fifteen bytes of the accessory information shown in FIG. 6. That is, the first camera controller 101 requests the accessory information from the accessory 200. In the accessory 200, the accessory controller 201 transmits the accessory information to the camera 100 in response to the accessory information request from the camera 100. The camera 100 receives the accessory information.

In a step S406, the first camera controller 101 determines whether the attached accessory 200 is a device compatible with the camera 100 on the basis of the accessory information obtained in the step S405. When determining that the attached accessory 200 is a compatible accessory, the first camera controller 101 proceeds with the process to a step S407. When determining that the attached accessory 200 is an incompatible accessory, the first camera controller 101 finishes the process shown in FIG. 11 and proceeds with the process to error handling (not shown). In the error handling, the first camera controller 101 notifies the user that the attached accessory 200 is an incompatible accessory by a display message or a voice.

In a step S407, the first camera controller 101 controls the power control signal CNT_VACC2 to the High level to turn ON the output of the second accessory-directed power source 132. Then, the process proceeds to a step S408. When the power control signal CNT_VACC2 becomes High, the second accessory-directed power source 132 outputs the accessory power VACC. In the embodiment, when both the power control signal CNT_VACC1 and power control signal CNT_VACC2 are controlled to the High level, the second accessory-directed power source 132 shall output the accessory power VACC.

In the step S408, the first camera controller 101 notifies the second camera controller 102 of the accessory information read in the step S405. and finishes the process shown in FIG. 11.

Figure 12:
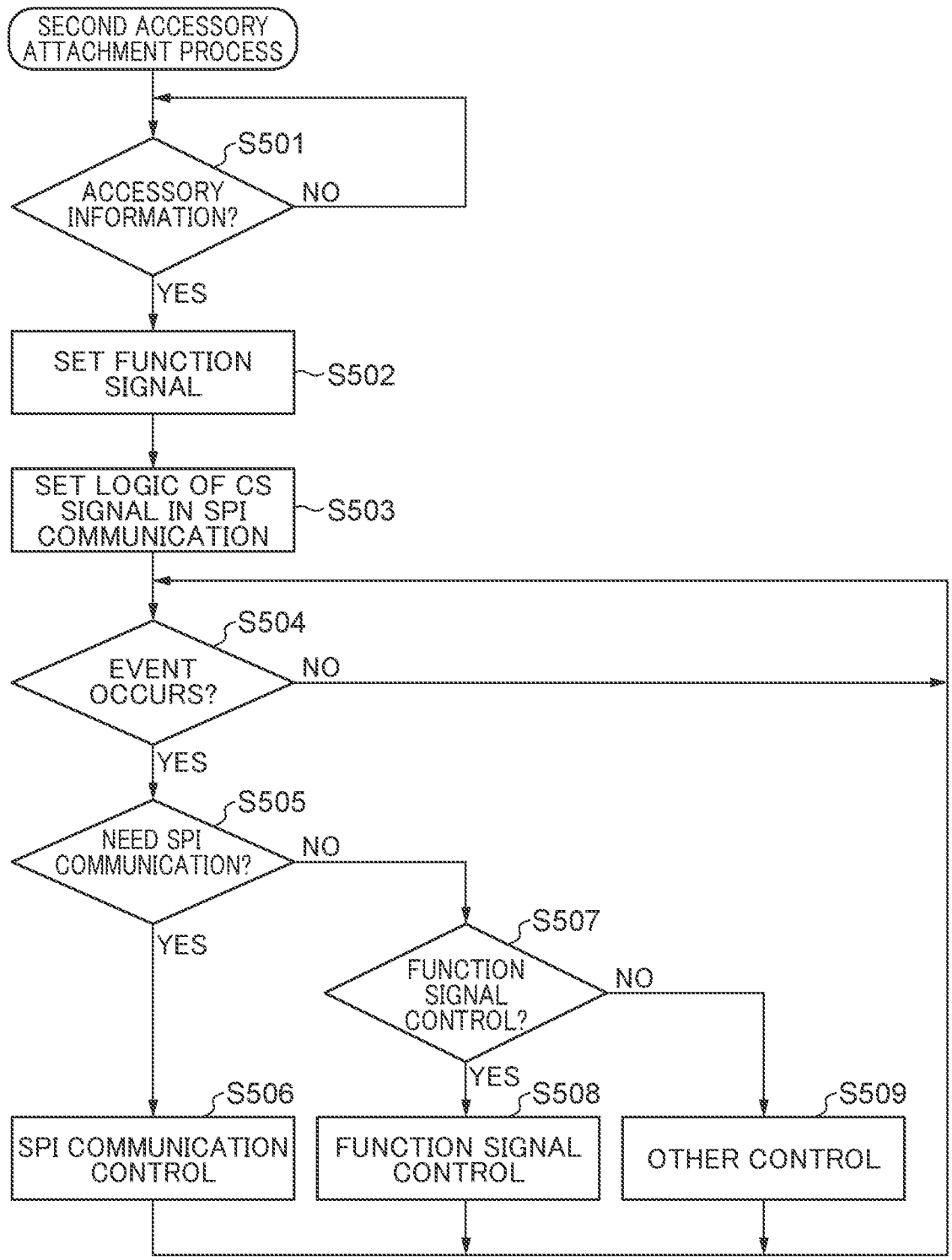
FIG. 12 is a flowchart showing a second accessory attachment process.

FIG. 12 is a flowchart showing a second accessory attachment process executed by the camera 100. The flowchart shows the process by the second camera controller 102 executed until the accessory 200 is attached to the camera 100 and the function of the accessory 200 becomes available. The second accessory attachment process is achieved when the CPU in the second camera controller 102 develops and runs a program stored in the ROM (not shown) in the second camera controller 102 to the RAM (not shown) in the second camera controller 102. This process starts when the first accessory attachment process (FIG. 11) starts.

In a step S501, the second camera controller 102 waits until the accessory information is given from the first camera controller 101. The accessory information is given in the step S408 in FIG. 11. When receiving the accessory information, the second camera controller 102 sets the function signals (FNC1 through FNC4) in a step S502 on the basis of the given accessory information.

For example, when the accessory 200 is determined as a microphone device on the basis of the accessory information, the second camera controller 102 sets so that the FNC1 signal will function as an audio-data clock signal. Similarly, the second camera controller 102 sets so that the FNC2 signal and FNC3 signal will respectively function as an audio-data channel signal and a voice data signal.

Moreover, for another example, when the accessory 200 is a flash device, the second camera controller 102 sets so that the FNC4 signal will function as a flash emission synchronization signal (flash emission timing signal). A function signal of which control is unnecessary to the accessory 200 may be set so as not to cause trouble in the operation of the camera 100 and accessory 200.

In a step S503, the second camera controller 102 sets up the control logic of the CS signal in the SPI communication on the basis of the accessory information given from the first camera controller 101. In a step S504, the second camera controller 102 waits until an event to the accessory 200 occurs (is detected). When an event occurs, the process proceeds to a step S505.

In the step S505, the second camera controller 102 determines whether the event detected in the step S504 needs the SPI communication with the accessory 200. When the detected event needs the SPI communication, the second camera controller 102 proceeds with the process to a step S506. When the detected event does not need the SPI communication, the process proceeds to a step S507.

In the step S506, the second camera controller 102 controls the SPI communication to the accessory 200. For example, when the accessory 200 is a microphone device, instruction communication for turning ON/OFF a microphone operation, instruction communication for switching a sound collection directionality of a microphone, instruction communication for switching an equalizer function of the microphone, etc. are performed as the SPI communication. Moreover, when the accessory 200 is a flash device, communication for reading setting information about the flash, communication for notifies the flash of the setting information, etc. are performed as the above-mentioned SPI communication. After the step S506, the second camera controller 102 returns the process to the step S504.

In the step S507, the second camera controller 102 determines whether the detected event needs control of the accessory 200 using the function signal. When the detected event needs the control using the function signal, the second camera controller 102 proceeds with the process to a step S508. When the detected event does not need the control using the function signal, the process proceeds to a step S509.

In the step S508, the second camera controller 102 controls the accessory 200 on the basis of the function signal. For example, when the accessory 200 is the microphone device, an output of an audio-data clock signal of the FNC1, an output of an audio-data channel signal of the FNC2, an input of an audio data signal of the FNC3 are controlled using the function signal. Thereby, the camera 100 can obtain voice data from the accessory 200. Moreover, when the accessory 200 is the flash device, the flash emission synchronization signal of the FNC4 can be controlled at a predetermined timing. Thereby, the flash can be notified of the emission instruction. After the step S508, the second camera controller 102 returns the process to the step S504.

In the step S509, the second camera controller 102 executes "other control" corresponding to the event detected in the step S504. When the detected event needs the I2C communication, the second camera controller 102 controls the I2C communication to the accessory 200 in the other control. In addition, the second camera controller 102 performs in-camera control according to the detected event in the other control. When the accessory 200 is a microphone device, start/finish control of recording of voice data into the recording memory 126, and control of an equalizer process to voice data are performed as the in-camera control executed in the step S509, for example. Moreover, when the accessory 200 is a flash device, photometry control that obtains the light amount of the light emitted by the flash accumulated by the image sensor 122 and calculation control of an emission-amount instruction value of the flash, etc. are performed as the in-camera control. After the step S509, the second camera controller 102 returns the process to the step S504.

In the processes shown in FIG. 11 and FIG. 12, the camera-side connector 141, the first camera controller 101, and the second camera controller 102 achieve the function of the communication unit in the present disclosure. Moreover, the first camera controller 101 achieves the functions of the obtainment unit, determination unit, and controller in the present disclosure.

Figure 13:
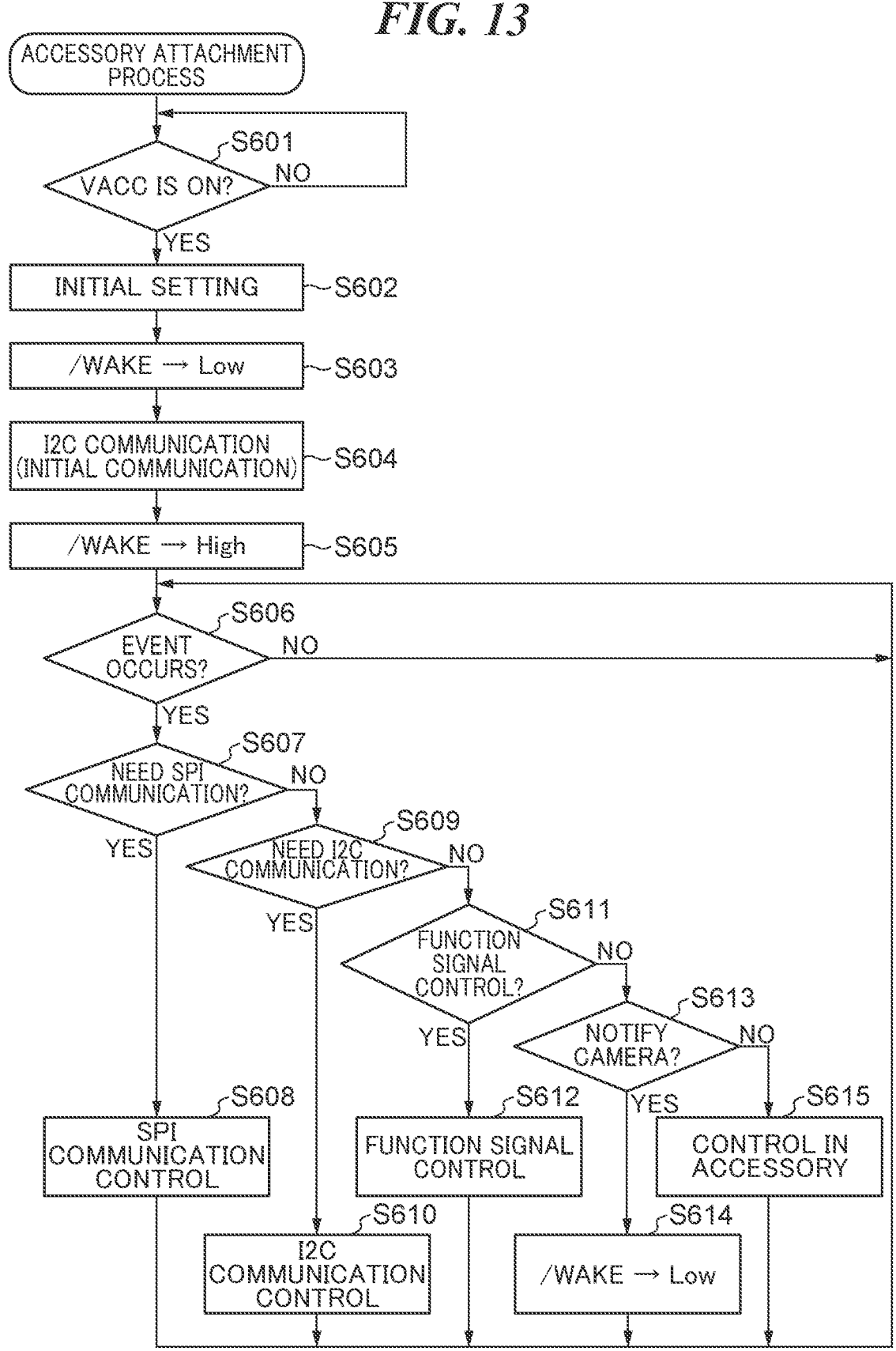
FIG. 13 is a flowchart showing an accessory attachment process.

FIG. 13 is a flowchart showing a second accessory attachment process executed by the accessory 200. The flowchart shows the process by the accessory controller 201 executed until the accessory 200 is attached to the camera 100 and the function of the accessory 200 becomes available. This process is achieved when the CPU in the accessory controller 201 develops and runs a program stored in the ROM (not shown) in the accessory controller 201 to the RAM (not shown) in the accessory controller 201. This process starts when the accessory 200 is attached to the camera 100.

In a step S601, the accessory controller 201 waits until the accessory power VACC from the camera 100 turns ON. When the accessory power VACC turns ON, the process proceeds to a step S602. Aside from this method, when the accessory 200 has the battery 205, the accessory controller 201 may monitor a voltage of the accessory power VACC and may detect turning ON of the accessory power VACC. If the accessory 200 does not have the battery 205, n a configuration of that the It should be noted that accessory 200 does not have the battery 205, a power source is supplied to the accessory controller 201, and you may determine that accessory power VACC turned on because accessory controller 201 self-started operation.

In the step S602, the accessory controller 201 performs an initial setting. The initial setting includes a setting of an operating frequency of the microcomputer, initialization of an input/output control port of the microcomputer, initialization of a timer function of the microcomputer, initialization of an interruption function of the microcomputer, etc. In a step S603, the accessory controller 201 notifies the camera 100 that the initial setting is completed (communication becomes available) by controlling the communication request signal/WAKE to the Low level.

In a step S604, the accessory controller 201 responds to the I2C communication as the initial communication from the camera 100 and transmits fifteen bytes of the accessory information (FIG. 6). In a step S605, the accessory controller 201 controls the communication request signal/WAKE to the High level. In a step S606, the accessory controller 201 waits until an event occurs (is detected). When an event occurs, the process proceeds to a step S607. Accordingly, the accessory information is transmitted in the first communication after notifying of the information showing that the communication becomes available and before starting the operation based on the event.

In a step S607, the accessory controller 201 determines whether the event detected in the step S606 needs the SPI communication with the camera 100. When the detected event needs the SPI communication, the accessory controller 201 proceeds with the process to a step S608. When the detected event does not need the SPI communication, the process proceeds to a step S609.

In the step S608, the accessory controller 201 controls the SPI communication with the camera 100. When the communication request signal/WAKE is Low at the time of controlling the SPI communication, the accessory controller 201 sets the communication request signal/WAKE to High after the SPI communication.

When the accessory 200 is the microphone device, instruction communication for turning ON/OFF a microphone operation from the camera 100 is performed as the SPI communication control in the step S608, for example. Moreover, instruction communication for switching a sound collection directionality of a microphone, instruction communication for switching an equalizer function of the microphone, etc. are performed as the SPI communication. Moreover, when the accessory 200 is a flash device, communication for reading setting information on the flash, communication for notifies the flash of the setting information, etc. are performed as the SPI communication control. After the step S608, the accessory controller 201 returns the process to the step S606.

In a step S609, the accessory controller 201 determines whether the detected event needs the I2C communication with the camera 100. When the detected event needs the I2C communication, the accessory controller 201 proceeds with the process to a step S610. When the detected event does not need the I2C communication, the process proceeds to a step S611.

In the step S610, the accessory controller 201 controls the I2C communication with the camera 100. When the communication request signal/WAKE is Low at the time of controlling the I2C communication, the accessory controller 201 sets the communication request signal/WAKE to High after the I2C communication. Communication for reading a communication request factor in response to the communication request signal/WAKE that the accessory controller 201 notifies the camera 100 is performed as the I2C communication control in the step S610, for example. After the step S610, the accessory controller 201 returns the process to the step S606.

In the step S611, the accessory controller 201 determines whether the event detected in the step S606 uses the function signal. When the detected event needs the control using the function signal, the accessory controller 201 proceeds with the process to a step S612. When the detected event does not need the control using the function signal, the process proceeds to a step S613.

In the step S612, the accessory controller 201 controls the camera 100 using the function signal. When the accessory 200 is the microphone device, the following control is taken as the control using the function signal executed in the step S612.

For example, the reception control of the audio-data clock signal of the FNC1 and the audio-data channel signal of the FNC2 that are output from the camera 100, and the output control of the audio data of the FNC2 in synchronization with these signals are performed as the control using the function signal. In the meantime, when the accessory 200 is the flash device, the flash emission control by controlling the received flash emission synchronization signal of the FNC4 is performed as the control using the function signal in the step S612. After the step S612, the accessory controller 201 returns the process to the step S606.

In the step S613, the accessory controller 201 determines whether the event detected in the step S606 is given to the camera 100 in response to the communication request signal/WAKE. When the detected event needs to notify the camera in response to the communication request signal/WAKE, the accessory controller 201 proceeds with the process to a step S614. When the detected event does not need to notify the camera in response to the communication request signal/WAKE, the accessory controller 201 proceeds with the process to a step S615.

In the step S614, the accessory controller 201 stores the communication request factor number to the camera 100 corresponding to the event detected in the step S606 into the volatile memory (not shown) of the accessory 200 and controls the communication request signal/WAKE to be Low. This communication request factor number is a unique number assigned for each content of a factor as described by referring to FIG. 9. After the step S614, the accessory controller 201 returns the process to the step S606.

In a step S615, the accessory controller 201 performs in-accessory control according to the event detected in the step S606. For example, when the accessory 200 has the battery 205, a battery residue detection control is performed as the in-accessory control in the step S615. In addition, a detection control of the operation switch 212 is also performed as the in-accessory control. After the step S615, the accessory controller 201 returns the process to the step S606.

It should be noted that the process shown in FIG. 13 is finished when the main power supply of the camera 100 is turned OFF, when the mode of the camera 100 is shifted to the automatic off mode, and when the accessory 200 is detached from the camera 100.

As mentioned above, after executing the processes shown in FIG. 11, FIG. 12, and FIG. 13, the camera 100 becomes available to control the accessory 200 and the accessory 200 becomes available to operate.

Hereinafter, the operation of the camera 100 as the image pickup apparatus according to the first embodiment of the present disclosure will be described.

Figure 14:
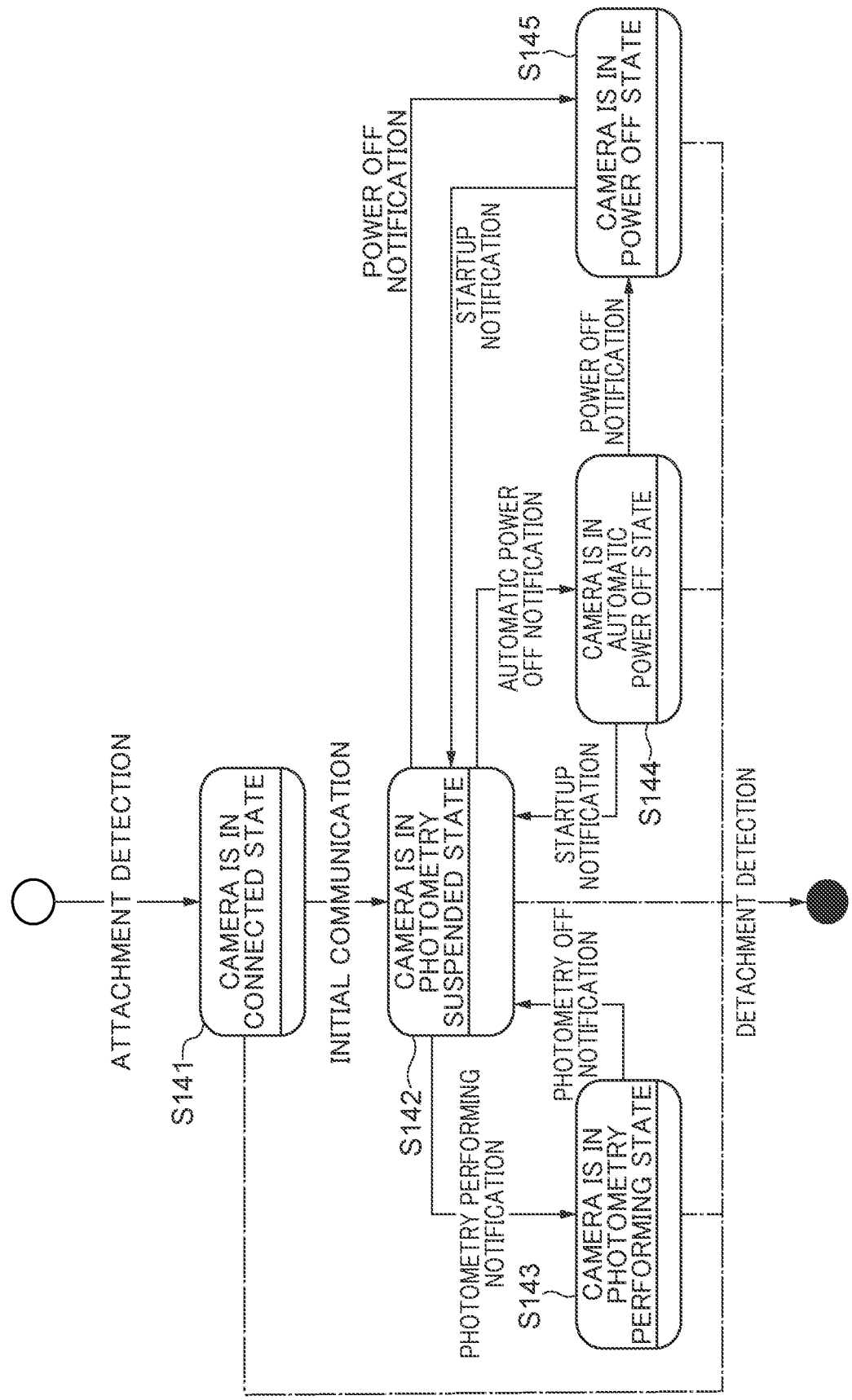
FIG. 14 is a view showing states of the camera that are recognized by the accessory controller according to a first embodiment of the present disclosure.

FIG. 14 is a view showing the states of the camera 100 that is recognized by the accessory controller 201 (a state recognition unit).

When detecting that the accessory 200 is attached to the camera 100, the accessory controller 201 proceeds to a step S141 and recognizes transition of the camera 100 from an initial state to a connected state. In this embodiment, when receiving a predetermined signal from the accessory power source 202, the accessory controller 201 detects that the accessory 200 is attached to the camera 100. Specifically, when the accessory 200 is attached, the camera 100 outputs the accessory power VACC to the contact TC05 of the camera-side connector 141. In the accessories 200, the accessory power VACC is supplied to the accessory power source 202 through the contact TAOS of the accessory-side connector 211. When the accessory power VACC is supplied, the accessory power source 202 starts to output the predetermined signal to the accessory controller 201, When receiving the predetermined signal from the accessory power source 202, the accessory controller 201 detects that the accessory 200 is attached to the camera 100. In the meantime, when the accessory 200 is detached from the camera 100, the supply of the accessory power VACC to the accessory power source 202 stops, and the accessory power source 202 stops supplying the predetermined signal to the accessory controller 201. When transmission of the predetermined signal from the accessory power source 202 stops, the accessory controller 201 detects that the accessory 200 is detached from the camera 100.

The attachment of the accessory 200 to the camera 100 and the detachment of the accessory 200 from the camera 100 may be detected by a method other than the output of the predetermined signal from the accessory power source 202. For example, these may be determined according to the signals FNC1 through FNC4 received via the function unit 206.

When the initial communication is received from the camera 100 that is currently recognized to be in the connected state, the accessory controller 201 proceeds to a step S142 and recognizes transition of the camera 100 to a photometry suspended state. The initial communication from the camera 100 uses the SPI communication (first communication) and the I2C communication (second communication) that are different in granularity of transmitted information. As mentioned above, the SPI communication uses the SCLK signal, MOSI signal, and MISO signal that are respectively output from the contacts TC07, TC08, and TC09 of the camera-side connector 141. Moreover, the I2C communication uses the SDA signal and SCL signal that are respectively output from the contacts TC12 and TC13 of the camera-side connector 141.

When a photometry performing notification is received from the camera 100 that is currently recognized to be in the photometry suspended state, the accessory controller 201 proceeds to a step S143 and recognizes transition of the camera 100 to a photometry performing state.

When an automatic power off notification is received from the camera 100 that is currently recognized to be in the photometry suspended state, the accessory controller 201 proceeds to a step S144 and recognizes transition of the camera 100 to an automatic power off state.

Moreover, when a power off notification is received from the camera 100 that is currently recognized to be in the photometry suspended state, the accessory controller 201 proceeds to a step S145 and recognizes transition of the camera 100 to a power off state. Similarly, when the power off notification is received from the camera 100 that is currently recognized to be in the automatic power off state, the accessory controller 201 proceeds to the step S145 and recognizes transition of the camera 100 to the power off state.

When a photometry off notification is received from the camera 100 that is currently recognized to be in the photometry performing state, the accessory controller 201 proceeds to the step S142 and recognizes transition of the camera 100 to the photometry suspended state.

When a startup notification is received from the camera 100 that is currently recognized to be in the automatic power off state, the accessory controller 201 proceeds to the step S142 and recognizes transition of the camera 100 to the photometry suspended state.

When the startup notification is received from the camera 100 that is currently recognized to be in the power off state, the accessory controller 201 proceeds to the step S142 and recognizes transition of the camera 100 to the photometry suspended state.

When detecting detachment of the accessory 200 from the camera 100 that is currently recognized to be in any state shown in FIG. 14, the accessory controller 201 (detachment detection unit) recognizes that the state of the camera 100 is returned to the initial state. As mentioned above, in this embodiment, when the transmission of the predetermined signal from the accessory power source 202 stops, the accessory controller 201 detects that the accessory 200 is detached from the camera 100.

When the camera 100 is in the photometry performing state, the second camera controller 102 (first communication unit) obtains the information stored in the accessory 200 by performing the SPI communication with the accessory 200 periodically, and displays the obtained information as accessory related information on the display unit 127. Moreover, on the display unit 127, an object image formed on the image sensor 122 is displayed as a through image together with the accessory related information. Moreover, image pickup parameters, such as a shutter speed, an aperture, and ISO, which are used at a time of picking up an image, are also displayed on the display unit 127. Specifically, when the accessory 200 is a flash device, the following image pickup parameters are displayed on the display unit 127. For example, when information showing that the accessory 200 is in an emission available state is obtained by the SPI communication, the image pickup parameters for flash emission are displayed on the display unit 127. In the meantime, when the information showing that the accessory 200 is in an emission unavailable state is obtained by the SPI communication, the image pickup parameters for flash non-emission are displayed on the display unit 127. In this embodiment, the emission available state means that charge of an emission unit by a charge unit is completed in the function unit 206 and the emission unit enables emission. Moreover, the emission unavailable state means that charge of the emission unit by the charge unit does not reach a predetermined charge level and the emission unit cannot emit light.

When the camera 100 is in the photometry suspended state (first state), the second camera controller 102 stops the SPI communication with the accessory 200, but the through image and the image pickup parameters are continuingly displayed on the display unit 127.

When the camera 100 is in the automatic power off state (second state), the power supply from the system power source 112 to the second camera controller 102 is stopped. Accordingly, the second camera controller 102 not only stops the SPI communication with the accessory 200 but also stops displaying the through image and the image pickup parameters on the display unit 127.

In addition, when the camera 100 is in the photometry suspended state or the automatic power off state, the electric power is supplied to the first camera controller 101, and the first camera controller 101 is in a standby mode. The standby mode is released when the camera 100 starts up due to an operation of a switch (not shown) connected to the first camera controller 101 or when the signal state of the communication request signal/WAKE of the contact TC11 of the camera-side connector 141 varies.

When the camera 100 is in the power off state, the power supply from the system power source 112 to the second camera controller 102 is stopped. In the meantime, the electric power is supplied to the first camera controller 101, and the first camera controller 101 stops the communication with the accessory 200 but is in the standby mode. Accordingly, only when the power switch among switches (not shown) for the camera operation connected to the first camera controller 101, the standby mode of the first camera controller 101 is released.

Figure 15:
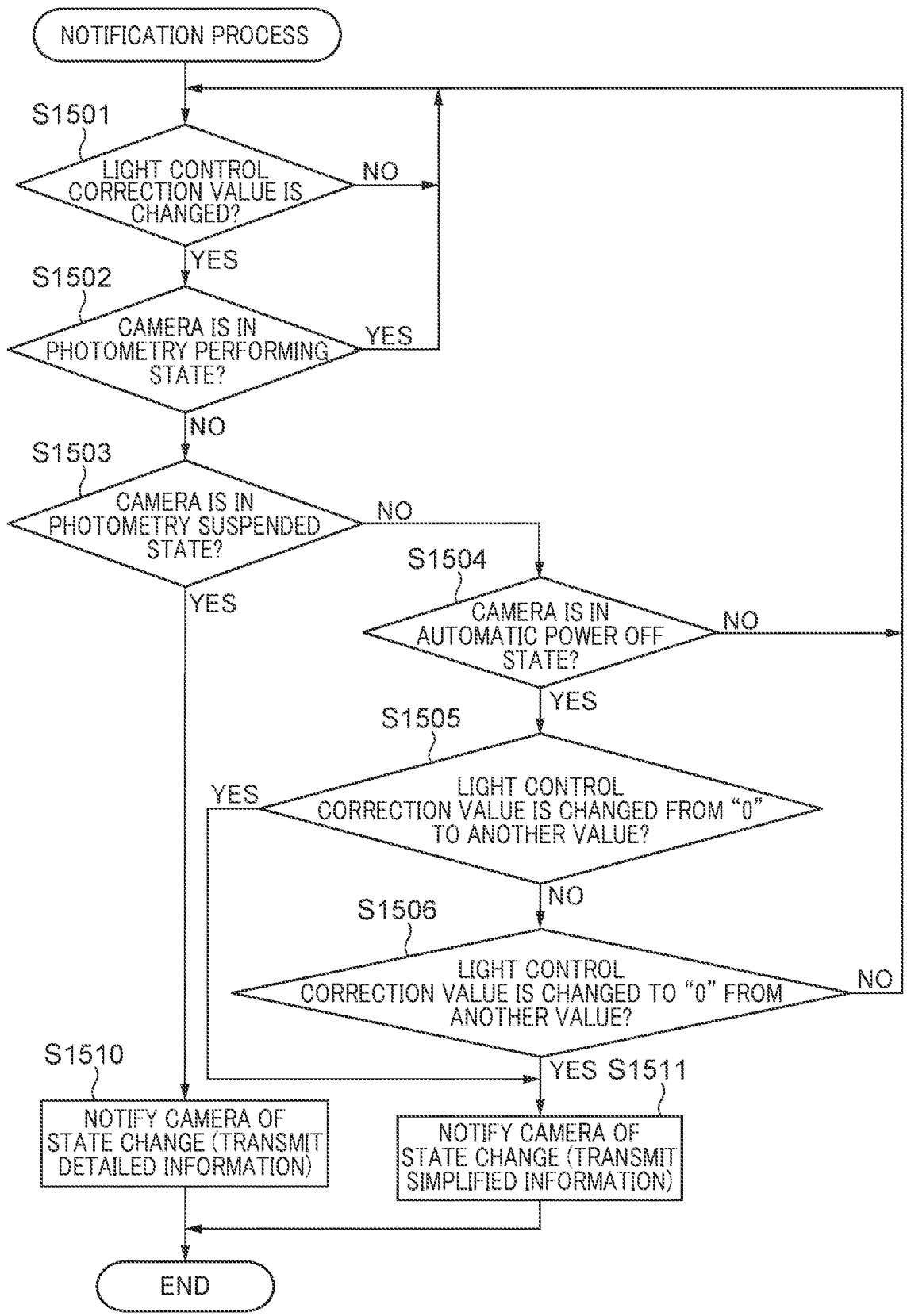
FIG. 15 is a flowchart showing a notification process that notifies the camera when a light control correction value of an automatic light control mode of a flash device, which is the accessory according to the first embodiment of the present disclosure, is changed.

FIG. 15 is a flowchart showing a notification process that notifies the camera 100 when a light control correction value of an automatic light control mode of a flash device as the accessory 200 is changed.

In a step S1501, the accessory controller 201 checks whether the light control correction value of the accessory 200 has been changed. When the light control correction value has been changed (YES in the step S1501), the process proceeds to a step S1502. Otherwise, the process returns to the step S1501 and the change of the light control correction value is checked again. The light control correction value of the accessory 200 can be changed by a user's operation of the operation switch 212, for example.

In the step S1502, the accessory controller 201 checks whether the camera 100 is currently recognized to be in the photometry performing state (third state) shown in the step S143 in FIG. 14. When the camera 100 is not in the photometry performing state (NO in the step S1502), the process proceeds to a step S1503. Otherwise, the process returns to the step S1501 and the change of the light control correction value is checked again. As mentioned above, when the camera 100 is in the photometry performing state, the second camera controller 102 periodically obtains the information like the light control correction value that is stored in the accessory 200 by the SPI communication with the accessory 200. Moreover, the light control correction value of the accessory 200 obtained periodically is displayed on the display unit 127 of the camera 100 as the accessory related information.

In the step S1503, the accessory controller 201 checks whether the camera 100 is currently recognized to be in the photometry suspended state shown in the step S142 in FIG. 14. When the camera 100 is in the photometry suspended state (YES in the step S1503), the process proceeds to a step S1510. Otherwise, the process proceeds to a step S1504.

In the step S1504, the accessory controller 201 checks whether the camera 100 is currently recognized to be in the automatic power off state shown in the step S144 in FIG. 14. When the camera 100 is in the automatic power off state (YES in the step S1504), the process proceeds to a step S1505. Otherwise, the process returns the step S1501 and the change of the light control correction value is checked again.

In the step S1505, the accessory controller 201 checks whether the light control correction value has been changed to "0" (a first value) from a value other than "0" (a second value). When the light control correction value has been changed to "0" from a value other than "0", the process proceeds to a step S1511. Otherwise, the process proceeds to a step S1506.

In the step S1506, the accessory controller 201 checks whether the light control correction value has been changed to a value other than "0" from "0". When the light control correction value has been changed to a value other than "0" from "0", the process proceeds to the step S1511. Otherwise, the process returns to the step S1501 and the change of the light control correction value is checked again.

The accessory controller 201 (notification unit) notifies the camera 100 of the change of the state of the accessory 200 in the step S1510, and finishes this process. In this step, the accessory controller 201 notifies the camera 100 of the change of the state of the accessory 200 by controlling the electric potential of the contact TA11 of the accessory-side connector 211 so as to change the signal state of the communication request signal/WAKE of the contact TC11 of the camera-side connector 141. When the accessory controller 201 notifies the camera 100 of the change of the state of the accessory 200, the first camera controller 101 releases the standby mode. After that, the first camera controller 101 accesses the address 0x0A of the nonvolatile memory of the accessory 200 by the I2C communication and inquires the factor of the communication request signal/WAKE. In response to the inquiry, the accessory controller 201 transmits response data in which "0" that requests the startup of the camera 100 is set as the data in D7 and a value showing the change of the light control correction value is set as the data in D6 through D0. When receiving the startup request in the response data, the second camera controller 102 starts the suspended SPI communication with the accessory 200. The accessory controller 201 (first transmission unit) transmits the information (detailed information) like the light control correction value that is stored in the accessory 200 to the camera 100 as a response to the SPI communication started by the second camera controller 102. When the above-mentioned detailed information is transmitted from the accessory controller 201, the second camera controller 102 displays this on the display unit 127.

The accessory controller 201 (notification unit) notifies the camera 100 of the change of the state of the accessory 200 in the step S1511, and finishes this process. When the accessory controller 201 notifies the camera 100 of the change of the state of the accessory 200, the first camera controller 101 (second communication unit) releases the standby mode. After that, the first camera controller 101 accesses the address 0x0A of the nonvolatile memory of the accessory 200 by the I2C communication and inquires the factor of the communication request signal/WAKE. In response to the inquiry, the accessory controller 201 transmits response data in which "1" that does not request the startup of the camera 100 is set as the data in D7 and a value showing the change of the light control correction value is set as the data in D6 through D0. That is, as a result of the above-mentioned notification to the camera 100 from the accessory controller 201 in the step S1511, simplified information that shows the change of the light control correction value is transmitted to the camera 100 from the accessory controller 201 (second transmission unit).

According to this process, even if the camera 100 is in the photometry suspended state, a user can know the light control correction value (detailed information) of the accessory 200 because it is displayed on the display unit 127. In this embodiment, the detailed information that shows the values of the control parameters about the accessory means first information and the simplified information showing whether the accessory 200 satisfies predetermined conditions means second information. For example, the values of the control parameters include the light control correction value, a manual emission amount, a bounce angle, a zoom position of the optical lens 121, etc. For example, the predetermined conditions include change of the light control correction value that has been set, change of the manual emission amount that has been set, change of the bounce angle, the emission available state, and change between the emission available state and emission unavailable state, etc.

Moreover, even if the camera 100 is in the automatic power off state, the first camera controller 101 can know whether the light control correction value is set to the accessory 200 (simplified information). Accordingly, for example, when the light control correction value may be set from the camera 100 exclusively from the light control correction value of the accessory 200, the first camera controller 101 can immediately determine whether the light control correction value can be set from the camera 100. For example, when obtaining the information that the light control correction value is set to the accessory 200 as the simplified information, the first camera controller 101 determines that the light control correction value cannot be set from the camera 100.

Furthermore, when the camera is in the automatic power off state, the accessory controller 201 notifies the camera 100 of the change of the state of the accessory 200 only when the light control correction value of the accessory 200 varies from "0" to a value other than "0" or varies from a value other than "0" to "0". Thereby, the communication frequency between the camera 100 and the accessory 200 can be reduced.

In addition, when the accessory controller 201 detects that the accessory 200 is detached from the camera 100 after determining that the camera 100 is currently recognized to be in the photometry suspended state (YES in the step S1503), the accessory controller 201 finishes this process at that moment. Similarly, when the accessory controller 201 detects the detachment after determining that the camera is currently recognized to be in the automatic power off state (YES in the step S1504), the accessory controller 201 finishes this process at that moment.

Hereinafter, an operation of the camera 100 as the image pickup apparatus according to a second embodiment of the present disclosure will be described. It should be noted that a configuration in this embodiment identical to that in the first embodiment is indicated by the same reference numeral and a duplicate description is omitted.

Figure 16:
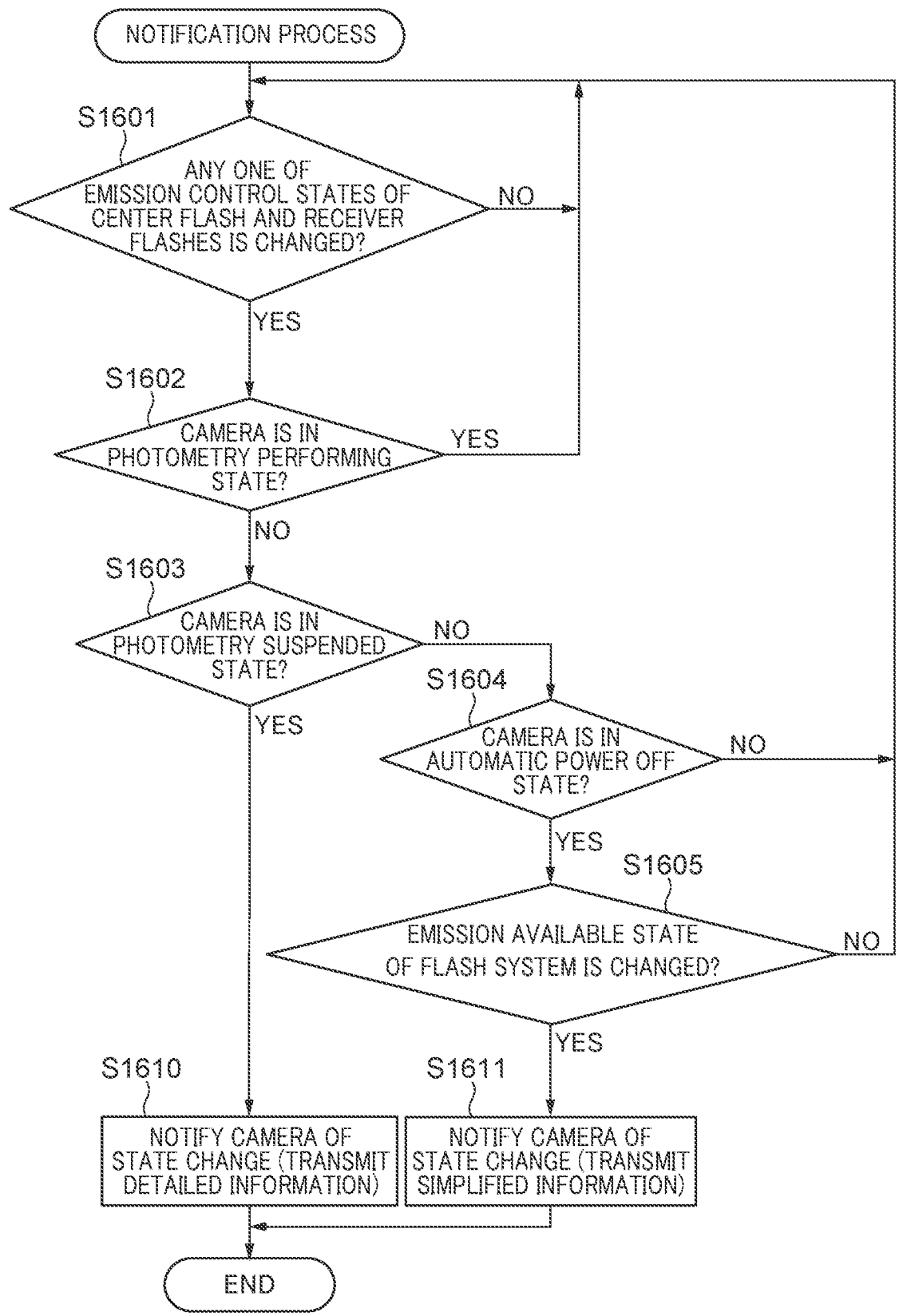
FIG. 16 is a flowchart showing a notification process that notifies the camera when an emission control state of a multiple flash system, of which a sender flash is an accessory according to a second embodiment of the present disclosure, varies.

FIG. 16 is a flowchart showing a notification process that notifies the camera 100 when an emission control state of a multiple flash system, of which a sender flash is the accessory 200, varies.

In addition, the multiple flash system is formed by wirelessly controlling a plurality of receiver flashes by the accessory 200 as the sender flash. Moreover, each of the receiver flashes is provided with a function unit containing an emission unit and a charge unit as with the accessory 200.

The emission control state of the accessory 200 becomes the emission available state when the charge of the emission unit by the charge unit is completed, and becomes the emission unavailable state when the charge is not completed. Similarly, the emission control state of each of the receiver flashes becomes the emission available state when the charge of the emission unit by the charge unit is completed in its function unit, and becomes the emission unavailable state when the charge is not completed. The accessory controller 201 obtains the emission control state of each of the receiver flashes by wireless communication.

Moreover, when the sender flash and all the receiver flashes are in the emission available state, the accessory controller 201 determines that the multiple flash system is in the emission available state (a first value). In the meantime, when any one of the sender flash and all the receiver flashes is in the emission unavailable state, the accessory controller 201 determines that the multiple flash system is in the emission unavailable state (a second value).

In a step S1601, the accessory controller 201 checks whether any one of the emission control states of the sender flash (accessory 200) and the receiver flashes is changed. When the emission control state of any one of flashes is changed (YES in the step S1601), the process proceeds to the step S1602. Otherwise, the process returns to the step S1601 and the change of the emission control state of each flash is checked again.

In the step S1602, the accessory controller 201 checks whether the camera 100 is currently recognized to be in the photometry performing state shown in the step S143 in FIG. 14. When the camera 100 is not in the photometry performing state (NO in the step S1602), the process proceeds to a step S1603. Otherwise, the process returns to the step S1601 and the change of the emission control state of each flash is checked again. As mentioned above, when the camera 100 is in the photometry performing state, the second camera controller 102 periodically obtains the emission control state of the sender flash and the emission control states of the receiver flashes from the accessory 200 as the sender flash by the SPI communication with the accessory 200. Moreover, the camera 100 displays the periodically obtained emission control states of the sender flash and receiver flashes on the display unit 127.

In the step S1603, the accessory controller 201 checks whether the camera 100 is currently recognized to be in the photometry suspended state shown in the step S142 in FIG. 14. When the camera 100 is in the photometry suspended state (YES in the step S1603), the process proceeds to a step S1610. Otherwise, the process proceeds to a step S1604.

In the step S1604, the accessory controller 201 checks whether the camera 100 is currently recognized to be in the automatic power off state shown in the step S144 in FIG. 14. When the camera 100 is in the automatic power off state (YES in the step S1604), the process proceeds to a step S1605. Otherwise, the process returns the step S1601 and the change of the emission control state of each flash is checked again.

In the step S1605, the accessory controller 201 checks whether the emission control state of the multiple flash system is changed. When the emission control state is changed (YES in the step S1605), the process proceeds to the step S1611. Otherwise, the process returns to the step S1601 and the change of the emission control state of each flash is checked again.

The accessory controller 201 notifies the camera 100 of the change of the state of the accessory 200 in the step S1610, and finishes this process. In this step, the accessory controller 201 notifies the camera 100 of the change of the state of the accessory 200 by controlling the electric potential of the contact TA11 of the accessory-side connector 211 so as to change the signal state of the communication request signal/WAKE of the contact TC11 of the camera-side connector 141. When the accessory controller 201 notifies the camera 100 of the change of the state of the accessory 200, the first camera controller 101 releases the standby mode.

After that, the first camera controller 101 accesses the address 0x0A of the nonvolatile memory of the accessory 200 by the I2C communication and inquires the factor of the communication request signal/WAKE. In response to the inquiry, the accessory controller 201 transmits response data in which "0" that requests the startup of the camera 100 is set as the data in D7 and a value showing the change of the emission available state of the multiple flash system is set as the data in D6 through D0.

When receiving the startup request in the response data, the second camera controller 102 starts the suspended SPI communication with the accessory 200. The accessory controller 201 transmits the emission control states of the sender flash and receiver flashes to the camera 100 as detailed information stored in the accessory 200 as a response to the SPI communication started by the second camera controller 102. When the above-mentioned detailed information is transmitted from the accessory controller 201, the second camera controller 102 displays this on the display unit 127.

The accessory controller 201 notification unit notifies the camera 100 of the change of the state of the accessory 200 in the step S1611, and finishes this process. When the accessory controller 201 notifies the camera 100 of the change of the state of the accessory 200, the first camera controller 101 releases the standby mode. After that, the first camera controller 101 accesses the address 0x0A of the nonvolatile memory of the accessory 200 by the I2C communication and inquires the factor of the communication request signal/WAKE. In response to the inquiry, the accessory controller 201 transmits response data in which "1" that does not request the startup of the camera 100 is set as the data in D7 and a value showing the change of the emission available state of the multiple flash system is set as the data in D6 through D0. That is, as a result of the above-mentioned notification to the camera 100 from the accessory controller 201 in the step S1611, simplified information that shows the change of the emission available state of the multiple flash system is transmitted to the camera 100 from the accessory controller 201 (second transmission unit).

According to this process, even if the camera 100 is in the photometry suspended state, the user can know the emission control states (detailed information) of the sender flash and receiver flashes because they are displayed on the display unit 127.

Moreover, even if the camera 100 is in the automatic power off state, the user can know the emission control state (simplified information) of the multiple flash system because it is displayed on the display unit 127. Accordingly, for example, when the user immediately starts an image pickup operation using the camera 100 in the automatic power off state, the user can determine at a moment whether the flash image pickup using the multiple flash system is available, which can shorten the period to the image pickup operation.

Furthermore, when the camera 100 is in the automatic power off state, the accessory controller 201 notifies the camera 100 of the change of the state of the accessory 200 only when the emission available state of the multiple flash system is changed. Thereby, the communication frequency between the camera 100 and the accessory 200 can be reduced.

In addition, when the accessory controller 201 detects that the accessory 200 is detached from the camera 100 after determining that the camera 100 is currently recognized to be in the photometry suspended state (YES in the step S1603), the accessory controller 201 finishes this process at that moment. Similarly, when the accessory controller 201 detects the detachment after determining that the camera is currently recognized to be in the automatic power off state (YES in the step S1604), the accessory controller 201 finishes this process at that moment.

Although the configuration in which the accessory 200 is directly attached to the camera 100 is described in the above-mentioned embodiments, another configuration may be employed. For example, a main accessory equivalent to the accessory 200 may communicate with the camera 100 via an intermediate accessory like an adapter device equipped with the camera 100. With such a configuration, at least a part of the communication control executed by the accessory 200 and the communication control executed by the camera 100 described in the above-mentioned embodiments may be executed by the intermediate accessory. Alternatively, the intermediate accessory may be used as an information transmission path that outputs information corresponding to information input from the camera to the main accessory and outputs information corresponding to information input from the main accessory to the camera 100. As mentioned above, the accessory defined in the present disclosure includes a microphone device, a lighting device, an adapter device, or the like. Moreover, an adapter device may be included also in an electronic apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-077483, filed Apr. 30, 2021, which is hereby incorporated by reference herein in its entirety.

What is claimed is:

1. An accessory that is detachably connected to an electronic apparatus, the accessory comprising:

a memory device that stores a set of instructions; and
at least one processor that executes the set of instructions to:
transmit first information among information stored in the accessory to the electronic apparatus in response to periodic first communication from a first communication unit of the electronic apparatus;
respond to inquiry by second communication from a second communication unit of the electronic apparatus; and
notify the electronic apparatus of change of the information stored in the accessory, in a case where the electronic apparatus is in one of a first state and a second state and the information stored in the accessory is changed,
wherein the first communication is stopped and the second communication unit is in a standby mode in the first state, and
wherein power supply to the first communication unit is stopped and the second communication unit is in the standby mode in the second state.

2. The accessory according to claim 1, wherein the at least one processor executes instructions in the memory device to:
release the standby mode of the second communication unit by notification; and
transmit second information different from the first information among the information stored in the accessory as a response to inquiry about the notification from the second communication unit in a case where the standby mode of the second communication unit of the electronic apparatus in the second state is released.

3. The accessory according to claim 2, wherein the first information shows a value of a control parameter about the accessory, and the second information shows whether the accessory satisfies a predetermined condition.

4. The accessory according to claim 1, wherein the at least one processor executes instructions in the memory device to:
release the standby mode of the second communication unit by notification; and
start the first communication by transmitting a startup request of the electronic apparatus as a response to the inquiry about the notification from the second communication unit in a case where the standby mode of the second communication unit of the electronic apparatus in the first state is released.

5. The accessory according to claim 1, wherein the at least one processor executes instructions in the memory device to:
recognize the state of the electronic apparatus; and
notify the electronic apparatus of the change of the information stored in the accessory in a case where the electronic apparatus is in one of the first state and the second state and the information stored in the accessory is changed.

6. The accessory according to claim 5, wherein the at least one processor executes instructions in the memory device to:
detect detachment of the accessory from the electronic apparatus; and
finish a process that notifies of the change of the information when the detachment is detected after recognizing that the electronic apparatus is in one of the first state and the second state.

7. The accessory according to claim 1, wherein the at least one processor executes instructions in the memory device to transmit the information stored in the accessory without notifying of the change of the information, in a case where the electronic apparatus is in a third state where the information stored in the accessory is periodically transmitted to the electronic apparatus and the information stored in the accessory is changed.

8. The accessory according to claim 1, wherein the information transmitted in response to the inquiry by the second communication and the first information are different in granularity.

9. The accessory according to claim 1, wherein the at least one processor executes instructions in the memory device not to notify of the change of the information even when the information stored in the accessory is changed in a case where the electronic apparatus is in the second state and a case where information that may be a first value among the information stored in the accessory is not changed from the first value to another value and is not changed from another value to the first value.

10. The accessory according to claim 1, wherein the standby mode is a mode in which electric power is supplied to the second communication unit and the second communication unit does not communicate with the accessory.

11. An electronic apparatus to which an accessory is detachably connected, the electronic apparatus comprising:
a first communication unit;
a second communication unit;
a memory device that stores a set of instructions; and
at least one processor that executes the set of instructions to:
obtain first information among information stored in the accessory in response to periodic first communication from the first communication unit;
obtain a response to inquiry to the accessory by second communication from the second communication unit; and
release a standby mode of the second communication unit in a case where the electronic apparatus is in one of a first state and a second state and the information stored in the accessory is changed,
wherein the first communication is stopped and the second communication unit is in the standby mode in the first state, and
wherein power supply to the first communication unit is stopped and the second communication unit is in the standby mode in the second state.

12. The electronic apparatus according to claim 11, wherein the at least one processor executes instructions in the memory device to:
transmit inquiry about notification to the accessory by the second communication in a case where the standby mode of the second communication unit of the electronic apparatus in the second state is released; and
obtain the information stored in the accessory from the accessory as a response to the inquiry.

13. The electronic apparatus according to claim 11, wherein the at least one processor executes instructions in the memory device to:
transmit inquiry about notification to the accessory by the second communication in a case where the standby mode of the second communication unit of the electronic apparatus in the first state is released;
obtain a startup request of the electronic apparatus from the accessory as a response to the inquiry; and
obtain the first information from the accessory in a case where the first communication is started in response to the startup request.

14. The electronic apparatus according to claim 13, wherein the at least one processor executes instructions in the memory device to display detailed information obtained after the first communication is started.

15. The electronic apparatus according to claim 13, wherein the first information shows a value of a control parameter about the accessory.

16. The electronic apparatus according to claim 11, wherein the standby mode is a mode in which electric power is supplied to the second communication unit and the second communication unit does not communicate with the accessory.

17. An image pickup system comprising:
an image pickup apparatus comprising:
 a first communication unit;
 a second communication unit;
 a first memory device that stores a first set of instructions; and
 first at least one processor that executes the first set of instructions to:
  obtain first information among information stored in an accessory connected to the image pickup apparatus in response to periodic first communication from the first communication unit;
  obtain a response to inquiry to the accessory by second communication from the second communication unit; and
the accessory comprising:
 a second memory device that stores a second set of instructions; and
 second at least one processor that executes the second set of instructions to:
  notify the image pickup apparatus of change of the information stored in the accessory in a case where the image pickup apparatus is in one of a first state and a second state and the information stored in the accessory is changed,
wherein the first communication is stopped and the second communication unit is in a standby mode in the first state, and
wherein power supply to the first communication unit is stopped and the second communication unit is in the standby mode in the second state.

* * * * *